United States Patent
Gray et al.

(10) Patent No.: US 11,755,484 B2
(45) Date of Patent: Sep. 12, 2023

(54) INSTRUCTION BLOCK ALLOCATION

(71) Applicant: Microsoft Technology Licensing, LLC, Redmond, WA (US)

(72) Inventors: Jan S. Gray, Bellevue, WA (US); Douglas C. Burger, Bellevue, WA (US); Aaron L. Smith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/752,418

(22) Filed: Jun. 26, 2015

(65) Prior Publication Data
US 2016/0378661 A1 Dec. 29, 2016

(51) Int. Cl.
*G06F 12/0831* (2016.01)
*G06F 9/30* (2018.01)
(Continued)

(52) U.S. Cl.
CPC ...... *G06F 12/0833* (2013.01); *G06F 9/30043* (2013.01); *G06F 9/30047* (2013.01);
(Continued)

(58) Field of Classification Search
CPC ............. G06F 12/0833; G06F 9/30043; G06F 12/128; G06F 9/3869; G06F 9/3806;
(Continued)

(56) References Cited

U.S. PATENT DOCUMENTS

| 5,615,350 A | 3/1997 | Hesson |
| 5,655,122 A * | 8/1997 | Wu .......................... G06F 8/445 |
| | | 712/239 |

(Continued)

FOREIGN PATENT DOCUMENTS

| CL | 2017003264 A1 | 6/2018 |
| CN | 1375083 A | 10/2002 |

(Continued)

OTHER PUBLICATIONS

Bouwens et al., "Architecture Enhancements for the ADRES Coarse-Grained Reconfigurable Array," High Performance Embedded Architectures and Compilers, Springer Berlin Heidelberg pp. 66-81 (2008).

(Continued)

*Primary Examiner* — Shawn Doman
(74) *Attorney, Agent, or Firm* — Klarquist Sparkman, LLP

(57) ABSTRACT

Apparatus and methods are disclosed for throttling processor operation in block-based processor architectures. In one example of the disclosed technology, a block-based instruction set architecture processor includes a plurality of processing cores configured to fetch and execute a sequence of instruction blocks. Each of the processing cores includes function resources for performing operations specified by the instruction blocks. The processor further includes a core scheduler configured to allocate functional resources for performing the operations. The functional resources are allocated for executing the instruction blocks based, at least in part, on a performance metric. The performance metric can be generated dynamically or statically based on branch prediction accuracy, energy usage tolerance, and other suitable metrics.

22 Claims, 18 Drawing Sheets

(51) Int. Cl.
   *G06F 9/38*    (2018.01)
   *G06F 11/30*   (2006.01)
   *G06F 12/128*  (2016.01)

(52) U.S. Cl.
   CPC .............. *G06F 9/381* (2013.01); *G06F 9/382* (2013.01); *G06F 9/3804* (2013.01); *G06F 9/3806* (2013.01); *G06F 9/3826* (2013.01); *G06F 9/3828* (2013.01); *G06F 9/3836* (2013.01); *G06F 9/3838* (2013.01); *G06F 9/3842* (2013.01); *G06F 9/3846* (2013.01); *G06F 9/3851* (2013.01); *G06F 9/3853* (2013.01); *G06F 9/3869* (2013.01); *G06F 9/3891* (2013.01); *G06F 11/30* (2013.01); *G06F 12/128* (2013.01); *G06F 2212/621* (2013.01)

(58) Field of Classification Search
   CPC .... G06F 9/30047; G06F 9/382; G06F 9/3891; G06F 9/3804; G06F 9/381; G06F 11/30; G06F 9/3826; G06F 9/3828; G06F 9/3836; G06F 9/3838; G06F 9/3842; G06F 9/3846; G06F 9/3851; G06F 9/3853; G06F 2212/69; G06F 2212/621
   USPC .......................................................... 712/30
   See application file for complete search history.

(56) References Cited

U.S. PATENT DOCUMENTS

| | | | |
|---|---|---|---|
| 5,742,803 A * | 4/1998 | Igarashi | G06F 8/433 |
| | | | 712/233 |
| 5,790,822 A | 8/1998 | Sheaffer et al. | |
| 5,796,997 A | 8/1998 | Lesartre et al. | |
| 5,832,297 A | 11/1998 | Ramagopal et al. | |
| 5,845,103 A | 12/1998 | Sodani et al. | |
| 5,923,892 A | 7/1999 | Levy | |
| 5,943,501 A | 8/1999 | Burger et al. | |
| 6,016,399 A | 1/2000 | Chang | |
| 6,044,222 A | 3/2000 | Simons et al. | |
| 6,061,776 A | 5/2000 | Burger et al. | |
| 6,067,572 A * | 5/2000 | Jensen | H04Q 3/66 |
| | | | 709/241 |
| 6,161,170 A | 12/2000 | Burger et al. | |
| 6,164,841 A | 12/2000 | Mattson et al. | |
| 6,167,566 A * | 12/2000 | Matsuo | G06F 8/433 |
| | | | 717/112 |
| 6,275,919 B1 | 8/2001 | Johnson | |
| 6,279,101 B1 | 8/2001 | Witt et al. | |
| 6,301,673 B1 | 10/2001 | Foster et al. | |
| 6,453,344 B1 | 9/2002 | Ellsworth et al. | |
| 6,493,820 B2 | 12/2002 | Akkary et al. | |
| 6,513,109 B1 | 1/2003 | Gschwind et al. | |
| 6,529,922 B1 | 3/2003 | Hoge | |
| 6,654,860 B1 | 11/2003 | Strongin et al. | |
| 6,732,260 B1 | 5/2004 | Wang et al. | |
| 6,804,632 B2 | 10/2004 | Orenstien et al. | |
| 6,851,043 B1 | 2/2005 | Inoue | |
| 6,877,059 B2 | 4/2005 | Solomon et al. | |
| 6,918,032 B1 | 7/2005 | Abdallah et al. | |
| 6,934,254 B2 | 8/2005 | Brown et al. | |
| 6,957,435 B2 | 10/2005 | Armstrong et al. | |
| 6,965,969 B2 | 11/2005 | Burger et al. | |
| 6,988,183 B1 | 1/2006 | Wong | |
| 6,993,640 B2 | 1/2006 | Doing et al. | |
| 6,996,698 B2 | 2/2006 | Slegal et al. | |
| 7,032,217 B2 | 4/2006 | Wu | |
| 7,036,036 B2 | 4/2006 | Vorbach et al. | |
| 7,051,188 B1 | 5/2006 | Kubala et al. | |
| 7,210,127 B1 | 4/2007 | Rangachari | |
| 7,228,402 B2 | 6/2007 | Rychlik et al. | |
| 7,284,100 B2 | 10/2007 | Slegal et al. | |
| 7,299,458 B2 | 11/2007 | Hammes | |
| 7,380,038 B2 | 5/2008 | Gray | |
| 7,392,524 B2 | 6/2008 | Ault et al. | |
| 7,587,578 B2 | 9/2009 | Isobe | |
| 7,649,952 B1 * | 1/2010 | Moon | H04L 25/03203 |
| | | | 375/265 |
| 7,664,940 B2 | 2/2010 | Conklin et al. | |
| 7,676,650 B2 | 3/2010 | Ukai | |
| 7,685,354 B1 | 3/2010 | Hetherington et al. | |
| 7,802,073 B1 | 9/2010 | Cheng et al. | |
| 7,853,777 B2 | 12/2010 | Jones et al. | |
| 7,873,776 B2 | 1/2011 | Hetherington et al. | |
| 7,877,580 B2 | 1/2011 | Eickemeyer et al. | |
| 7,917,733 B2 | 3/2011 | Kazuma | |
| 7,958,396 B2 | 6/2011 | Chitsaz et al. | |
| 8,055,881 B2 | 11/2011 | Burger et al. | |
| 8,055,885 B2 | 11/2011 | Nakashima | |
| 8,127,119 B2 | 2/2012 | Burger et al. | |
| 8,166,282 B2 | 4/2012 | Madriles et al. | |
| 8,180,997 B2 | 5/2012 | Burger et al. | |
| 8,201,024 B2 | 6/2012 | Burger et al. | |
| 8,225,315 B1 | 7/2012 | Cheng et al. | |
| 8,250,555 B1 | 8/2012 | Lee et al. | |
| 8,321,850 B2 | 11/2012 | Bruening et al. | |
| 8,341,639 B2 | 12/2012 | Lewis | |
| 8,433,885 B2 | 4/2013 | Burger et al. | |
| 8,447,911 B2 | 5/2013 | Burger et al. | |
| 8,464,002 B2 | 6/2013 | Burger et al. | |
| 8,464,271 B2 | 6/2013 | Eichenberger et al. | |
| 8,510,596 B1 | 8/2013 | Gupta et al. | |
| 8,515,975 B1 * | 8/2013 | Federici | G06F 16/248 |
| | | | 707/750 |
| 8,612,726 B2 | 12/2013 | Sharawi et al. | |
| 8,817,793 B2 | 8/2014 | Mushano | |
| 9,021,241 B2 | 4/2015 | Burger et al. | |
| 9,043,769 B2 | 5/2015 | Vorbach | |
| 9,053,292 B2 | 6/2015 | Abdallah | |
| 9,830,152 B2 | 11/2017 | Kothinti Naresh et al. | |
| 9,940,136 B2 | 4/2018 | Burger et al. | |
| 2001/0042173 A1 | 11/2001 | Bala et al. | |
| 2003/0012225 A1 | 1/2003 | Banerjee et al. | |
| 2003/0065835 A1 | 4/2003 | Maergner et al. | |
| 2003/0070062 A1 * | 4/2003 | Krishnan | G06F 9/3846 |
| | | | 712/234 |
| 2003/0101208 A1 | 5/2003 | Chauvel et al. | |
| 2003/0163671 A1 | 8/2003 | Gschwind et al. | |
| 2003/0233642 A1 * | 12/2003 | Hank | G06F 8/433 |
| | | | 717/156 |
| 2004/0034852 A1 | 2/2004 | Nakashima | |
| 2004/0154010 A1 * | 8/2004 | Marcuello | G06F 9/3808 |
| | | | 717/158 |
| 2005/0076194 A1 | 4/2005 | Kanapathippillai et al. | |
| 2006/0020769 A1 | 1/2006 | Herrell et al. | |
| 2006/0020944 A1 | 1/2006 | King et al. | |
| 2006/0031702 A1 | 2/2006 | Jardine et al. | |
| 2006/0041875 A1 | 2/2006 | Peri et al. | |
| 2006/0075207 A1 | 4/2006 | Togawa et al. | |
| 2006/0179196 A1 | 8/2006 | Gray | |
| 2006/0242391 A1 | 10/2006 | Elwood | |
| 2006/0282624 A1 | 12/2006 | Yakota | |
| 2007/0050557 A1 * | 3/2007 | Ferren | G06F 9/50 |
| | | | 711/141 |
| 2007/0055827 A1 | 3/2007 | Tsien | |
| 2007/0074011 A1 | 3/2007 | Borkar et al. | |
| 2007/0157006 A1 | 7/2007 | Jourdan et al. | |
| 2007/0162906 A1 | 7/2007 | Chandhoke | |
| 2007/0192540 A1 | 8/2007 | Gara et al. | |
| 2007/0239965 A1 | 8/2007 | Lewites et al. | |
| 2007/0255980 A1 | 11/2007 | Endo et al. | |
| 2007/0283105 A1 * | 12/2007 | Kalogeropulos | G06F 12/0862 |
| | | | 711/154 |
| 2008/0046621 A1 | 2/2008 | Okino et al. | |
| 2008/0109668 A1 | 5/2008 | Atkinson | |
| 2008/0235499 A1 | 9/2008 | Togawa | |
| 2008/0256345 A1 * | 10/2008 | Bose | G06F 9/3806 |
| | | | 712/239 |
| 2009/0013135 A1 | 1/2009 | Burger et al. | |
| 2009/0013153 A1 | 1/2009 | Hilton | |
| 2009/0013160 A1 | 1/2009 | Burger et al. | |

(56) References Cited

U.S. PATENT DOCUMENTS

| | | |
|---|---|---|
| 2009/0138681 A1 | 5/2009 | Saha |
| 2009/0150657 A1 | 6/2009 | Gschwind et al. |
| 2009/0177843 A1 | 7/2009 | Wallach et al. |
| 2009/0210661 A1 | 8/2009 | Alexander et al. |
| 2009/0276593 A1 | 11/2009 | Jacobson et al. |
| 2010/0031010 A1* | 2/2010 | Moyer ............... G06F 9/3806 712/238 |
| 2010/0146209 A1 | 6/2010 | Burger et al. |
| 2010/0325395 A1 | 12/2010 | Burger et al. |
| 2011/0060889 A1 | 3/2011 | Burger et al. |
| 2011/0072239 A1 | 3/2011 | Burger et al. |
| 2011/0078424 A1 | 3/2011 | Boehm et al. |
| 2011/0219222 A1 | 9/2011 | Eichenberger et al. |
| 2011/0238953 A1 | 9/2011 | Metsugi et al. |
| 2011/0238966 A1* | 9/2011 | Takebe ............... G06F 9/3806 712/239 |
| 2011/0289300 A1* | 11/2011 | Beaumont-Smith ........................ G06F 9/3806 712/205 |
| 2012/0017069 A1 | 1/2012 | Bourd et al. |
| 2012/0079102 A1 | 3/2012 | Damodaran et al. |
| 2012/0079488 A1 | 3/2012 | Phillips et al. |
| 2012/0124345 A1* | 5/2012 | Denman ............. G06F 9/3844 712/237 |
| 2012/0246450 A1 | 9/2012 | Abdallah |
| 2012/0204004 A1 | 10/2012 | Chen |
| 2012/0303933 A1 | 11/2012 | Manet et al. |
| 2012/0311306 A1 | 12/2012 | Mushano |
| 2013/0007423 A1 | 1/2013 | Burcea et al. |
| 2013/0024676 A1 | 1/2013 | Glew et al. |
| 2013/0086370 A1 | 4/2013 | Burger et al. |
| 2013/0198499 A1 | 8/2013 | Dice et al. |
| 2013/0246682 A1 | 9/2013 | Jandhyam |
| 2013/0339470 A1 | 12/2013 | Jeswani et al. |
| 2014/0033217 A1 | 1/2014 | Vajda et al. |
| 2014/0075144 A1 | 3/2014 | Sanders et al. |
| 2014/0082327 A1 | 3/2014 | Ghose |
| 2014/0095837 A1 | 4/2014 | Plotnikov et al. |
| 2014/0122836 A1* | 5/2014 | Gschwind ........... G06F 9/30072 712/205 |
| 2014/0136822 A1 | 5/2014 | Suggs et al. |
| 2014/0181475 A1 | 6/2014 | Abdallah |
| 2014/0189287 A1 | 7/2014 | Plotnikov |
| 2014/0201507 A1* | 7/2014 | Jayaseelan ........... G06F 9/3851 712/239 |
| 2014/0201508 A1* | 7/2014 | Busaba ................ G06F 9/38 712/239 |
| 2014/0281389 A1 | 9/2014 | Loktyukhin et al. |
| 2014/0281402 A1 | 9/2014 | Comparan et al. |
| 2014/0281424 A1 | 9/2014 | Bobba et al. |
| 2014/0298336 A1 | 10/2014 | Taniuchi |
| 2014/0317361 A1 | 10/2014 | Dally |
| 2014/0331236 A1* | 11/2014 | Mitra ................. G06F 15/7867 718/105 |
| 2014/0372736 A1 | 12/2014 | Greenhalgh |
| 2015/0067214 A1 | 3/2015 | Henry et al. |
| 2015/0067662 A1 | 3/2015 | Palalau |
| 2015/0095628 A1 | 4/2015 | Yamada et al. |
| 2015/0100757 A1 | 4/2015 | Burger et al. |
| 2015/0106595 A1 | 4/2015 | Khot et al. |
| 2015/0106604 A1* | 4/2015 | Greathouse ........... G06F 11/348 712/244 |
| 2015/0127928 A1 | 5/2015 | Burger et al. |
| 2015/0199199 A1 | 7/2015 | Burger et al. |
| 2015/0301863 A1 | 10/2015 | Jackson et al. |
| 2016/0055004 A1 | 2/2016 | Grochowski et al. |
| 2016/0179546 A1 | 6/2016 | Yamada et al. |
| 2016/0378479 A1 | 12/2016 | Burger et al. |
| 2016/0378483 A1 | 12/2016 | Burger et al. |
| 2016/0378484 A1 | 12/2016 | Burger et al. |
| 2016/0378488 A1 | 12/2016 | Burger et al. |
| 2016/0378491 A1 | 12/2016 | Burger et al. |
| 2016/0378493 A1 | 12/2016 | Burger et al. |
| 2016/0378496 A1 | 12/2016 | Gray et al. |
| 2016/0378499 A1 | 12/2016 | Burger et al. |
| 2017/0083340 A1 | 3/2017 | Burger et al. |
| 2017/0277536 A1 | 9/2017 | Kothinti naresh et al. |

FOREIGN PATENT DOCUMENTS

| | | |
|---|---|---|
| CN | 1682181 A | 10/2005 |
| CN | 1767502 A | 5/2006 |
| CN | 101203831 A | 6/2008 |
| CN | 101344843 | 1/2009 |
| CN | 101410795 A | 4/2009 |
| CN | 101452378 A | 6/2009 |
| CN | 102067684 A | 5/2011 |
| CN | 102096579 | 6/2011 |
| CN | 102306094 | 1/2012 |
| CN | 103473508 A | 12/2013 |
| CN | 103547993 A | 1/2014 |
| CN | 103744644 A | 4/2014 |
| CN | 104011705 A | 8/2014 |
| CN | 104049941 A | 9/2014 |
| CN | 104102474 A | 10/2014 |
| CN | 104310225 | 1/2015 |
| EP | 0 992 894 A1 | 4/2000 |
| EP | 1 039 374 A2 | 9/2000 |
| WO | WO 2004/001587 | 12/2003 |
| WO | WO 2009/006607 | 1/2009 |
| WO | WO 2011/031361 | 3/2011 |
| WO | WO 2013/081556 | 6/2013 |
| WO | WO 2013/095401 | 6/2013 |
| WO | 2014105206 A1 | 7/2014 |
| WO | WO 2014/193878 | 12/2014 |
| WO | 2016210026 A1 | 12/2016 |

OTHER PUBLICATIONS

Burger et al., "Scaling to the End of Silicon with EDGE Architectures," In Proceedings of Computer, vol. 37, Issue 7, Jul. 1, 2004, pp. 44-55.

Coons et al., "A Spatial Path Scheduling Algorithm for EDGE Architectures," In Proceedings of the 12th International Conference on Architectural Support for Programming Languages and Operating Systems (ASPLOS), Oct. 12, 2006, 12 pages.

Desikan et al., "Scalable Selective Re-Execution for EDGE Architectures," In Proceedings of the 11th International Conference on Architectural Support for Programming Languages and Operating Systems, Oct. 9, 2004, 13 pages.

Duric et al., "Dynamic-Vector Execution on a General Purpose EDGE Chip Multiprocessor," In Proceedings of the 2014 International Conference on Embedded Computers Syhstems: Architectures, Modeling, and Simulation (SAMOS XIV), Jul. 14-17, 2014, 8 pages.

Duric et al., "EVX: Vector Execution on Low Power EDGE Cores," Design, Automation and Test in European Conference and Exhibition, Mar. 24-28, 2014, 4 pages.

Duric et al., "ReCompAc: Reconfigurable compute accelerator," IEEE 2013 International Conference on Reconfigurable Computing and FPGAS (Reconfig), Dec. 9, 2013, 4 pages.

Gebhart et al., "An Evaluation of the TRIPS Computer System," In Proceedings of the 14th international conference on Architectural support for programming languages and operating systems, Mar. 7, 2009, 12 pages.

Govindan et al., "Scaling Power and Performance via Processor Composability," IEEE Transaction on Computers, No. 1, Aug. 2014, 14 pages.

Govindaraju et al., "DySER: Unifying Functionality and Parallelism Specialization for Energy-Efficient Computing," IEEE Micro, IEEE Service Center, Sep. 1, 2012, 14 pages.

Gray and Smith, "Towards an Area-Efficient Implementation of a High ILP EDGE Soft Processor: Comparing Out-of-Order Dataflow Instruction Scheduler Designs," poster temporarily on display during the 22nd IEEE International Symposium on Field-Programmable Custom Computing Machines, May 11-13, 2014, Boston, Massachusetts (poster on display for approximately 1-2 hours, and less than one day, May 2014).

(56) References Cited

OTHER PUBLICATIONS

Gulati et al., "Multitasking Workload Scheduling on Flexible Core Chip Multiprocessors," In Proceedings of the Computer Architecture News, vol. 36, Issue 2, May 2008, 10 pages.
Huang et al., "Compiler-Assisted Sub-Block Reuse," Retrieved on: Apr. 9, 2015; available at: http://citeseerx.ist.psu.edu/viewdoc/download?doi=10.1.1.33.155&rep=rep1&type=pdf (also published as Huang & Lilja, "Compiler-Assisted Sub-Block Reuse," UMSI ResearchReport/University of Minnesota Supercomputer Institute 73 (2000)).
Keckler et al., "Tera-Op Reliable Intelligently Adaptive Processing System (Trips)," In AFRL-IF-WP-TR-2004-1514, document dated Apr. 2004, 29 Pages.
Kim et al., "Composable Lightweight Processors," 13 pages (document also published as Kim, et al., "Composable lightweight processors," 40th Annual IEEE/ACM International Symposium on Microarchitecture (MICRO 2007), pp. 381-394, (2007)).
Li et al., "Code Layout Optimization for Defensiveness and Politeness in Shared Cache," 11 pages, (also published as Li, et al, "Code Layout Optimization for Defensiveness and Politeness in Shared Cache" 43rd International Conference on Parallel Processing (ICPP), IEEE, pp. 151-161 (2014)).
Mei et al., "ADRES: An Architecture with Tightly Coupled VLIW Processor and Coarse-Grained Reconfiguration Matrix," 10 pages, (also published as Mei, et al. "ADRES: An architecture with tightly coupled VLIW processor and coarse-grained reconfigurable matrix," In Proceedings of 13th International Conference on Field-Programmable Logic and Applications, pp. 61-70 (Sep. 2003)).
Melvin et al., "Enhancing Instruction Scheduling with a Block-Structured ISA," International Journal of Parallel Programming, vol. 23, No. 3, Jun. 1995, 23 pages.
Park et al., "Polymorphic Pipeline Array: A flexible multicore accelerator with virtualized execution for mobile multimedia applications," 42nd Annual IEEE/ACM International Symposium on Microarchitecture, Dec. 12, 2009, 11 pages.
Putnam et al., "Dynamic Vectorization in the E2 Dynamic Multicore Architecture," 6 pages (also published as Putnam, et al., "Dynamic vectorization in the E2 dynamic multicore architecture" ACM SIGARCH Computer Architecture News pp. 27-32. (2011)).
Robatmili et al., "How to Implement Effective Prediction and Forwarding for Fusable Dynamic Multicore Architectures," In Proceedings of the 19th IEEE International Symposium on High-Performance Computer Architecture, Feb. 23, 2013, 12 pages.
Sankaralingam et al., "Distributed Microarchitectural Protocols in the TRIPS Prototype Processor," 12 pages (also published as "Distributed Microarchitectural Protocols in the TRIPS Prototype Processor," Proceedings of 39th Annual IEEE/ACM International Symposium on Micro architecture, pp. 480-491 (2006)).
Sankaralingam et al., "Exploiting ILP, TLP, and DLP with Polymorphous TRIPS Architecture," In Proceedings of the 30th Annual International Symposium on Computer Architecture, Jun. 9, 2003, 12 pages.
Sibi et al., "Scaling Power and Performance via Processor Compos ability," University of Texas at Austin technical report No. TR-10-14 (2010), 20 pages.
Smith et al., "Compiling for EDGE Architectures," In Proceedings of International Symposium on Code Generation and Optimization, Mar. 26, 2006, 11 pages.
Smith, "TRIPS Application Binary Interface (ABI) Manual," Technical Report TR-05-22, Department of Computer Sciences, The University of Texas at Austin, Technical Report TR-05-22, document marked Oct. 10, 2006, 16 pages.
Tamches et al., "Dynamic Kernel Code Optimization," In Workshop on Binary Translation, 2001, 10 pages.
Aasaraai, et al., "Design Space Exploration of Instruction Schedulers for Out-of-Order Soft Processors", In Proceedings of the International Conference on Field-Programmable Technology, Dec. 8, 2010, 4 pages.
August, et al., "Architectural Support for Compiler-Synthesized Dynamic Branch Prediction Strategies: Rationale and Initial Results", In Proceedings of Third International Symposium on High-Performance Computer Architecture, Feb. 1, 1997, pp. 84-93.
Burger et al., "Design and Implementation of the TRIPS EDGE Architecture", In Proceedings of the 32nd Annual International Symposium on Computer Architecture, Jun. 4, 2005, pp. 1-41.
Bush et al., "Evaluation and Optimization of Signal Processing Kernels on the TRIPS Architecture", In Proceedings of 4th Annual Workshop on Optimizations for DSP and Embedded Systems, Mar. 2006, pp. 1-10.
Carli, "Flexible MIPS Soft Processor Architecture", In Technical Report of Massachusetts Institute of Technology, Jun. 18, 2008, pp. 1-49.
Chang et al., "Cooperative Caching for Chip Multiprocessors", In Proceedings of the 33rd annual international symposium on Computer Architecture, Jun. 17, 2006, 12 pages.
Cheah, et al., "Analysis and Optimization of a Deeply Pipelined FPGA Soft Processor", In Proceedings of International Conference on Field-Programmable Technology, Dec. 10, 2014, 4 pages.
Chiu et al., "Hyperscalar: A Novel Dynamically Reconfigurable Multi-core Architecture", In Proceedings of 39th International Conference on Parallel Processing, Sep. 13, 2010, pp. 277-286.
Coons et al., "Feature Selection for Instruction Placement in an EDGE Architecture," Mar. 17, 2007, 6 pages.
Coons et al., "A Spacial Path Scheduling Algorithm for EDGE Architectures," Oct. 20, 2006, p. 129.
Duong, et al., "Compiler-Assisted, Selective Out-of-Order Commit", In Journal of IEEE Computer Architecture Letters, vol. 12, Issue 1, Jan. 2013, 3 pages.
Fallin, et al., "The Heterogeneous Block Architecture", In Proceedings of 32nd IEEE International Conference on Computer Design, Oct. 19, 2014, pp. 1-8.
Gaudiot, et al., "The Sisal Model of Functional Programming and its Implementation", In Proceedings of Second Aizu International Symposium on Parallel Algorithms/Architectures Synthesis, Mar. 17, 1997, pp. 1-12.
González, et al., "Dependence Speculative Multithreaded Architecture", In Technical Report, Retrieved on: Jul. 1, 2015, 22 pages.
Gupta, "Design Decisions for Tiled Architecture Memory Systems," document marked Sep. 18, 2009, available at: http://cseweb.ucsd.edU/~a2gupta/uploads/2/2/7/3/22734540/researchexam.paper.pdf, 14 pages.
Hammond et al., "Programming with Transactional Coherence and Consistency (TCC)," ACM SIGOPS Operating Systems Review. vol. 38. No. 5. ACM, 2004, 13 pages.
Hammond et al., "Transactional Coherence and Consistency: Simplifying Parallel Hardware and Software," IEEE Computer Society, pp. 92-103, 2004.
Hammond et al., "Transactional Memory Coherence and Consistency," ACM SIGARCH Computer Architecture News. vol. 32. No. 2. IEEE Computer Society, 2004, 12 pages.
Hao et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.
Hayes, et al., "Unified On-chip Memory Allocation for SIMT Architecture", In Proceedings of the 28th ACM international conference on Supercomputing, Jun. 10, 2014, pp. 293-302.
Hruska, Joel., "VISC CPU 'virtual core' design emerges: Could this be the conceptual computing breakthrough we've been waiting for?", Published on: Oct. 24, 2014; Available at: http://www.extremetech.com/extreme/192858-visc-cpu-virtual-core-design-emerges-could-this-be-the-conceptual-breakthrough-weve-been-waiting-for.
Intel® 64 Architecture Processor Topology Enumeration, In White Paper of Intel, Dec. 13, 2013, pp. 1-29.
Ipek et al., "Core Fusion: Accommodating Software Diversity in Chip Multiprocessors", In Proceedings of the 34th annual international symposium on Computer architecture, Jun. 9, 2007, 12 pages.
Kamaraj, et al., "Design of Out-Of-Order Superscalar Processor with Speculative Thread Level Parallelism", In Proceedings of International Conference on Innovations in Engineering and Technology, Mar. 21, 2014, pp. 1473-1478.

(56) References Cited

OTHER PUBLICATIONS

Kavi, et al., "Concurrency, Synchronization, Speculation—the Dataflow Way", In Journal of Advances in Computers, vol. 96, Nov. 23, 2013, pp. 1-41.
Kinsy, et al., "Heracles: A Tool for Fast RTL-Based Design Space Exploration of Multicore Processors", In Proceedings of the ACM/SIGDA international symposium on Field programmable gate arrays, Feb. 11, 2013, pp. 125-134.
Maher et al., "Merging Head and Tail Duplication for Convergent Hyperblock Formation," In Annual IEEE/ACM International Symposium on Microarchitecture, Dec. 2006, 12 pages.
McDonald et al., "Characterization of TCC on Chip-Multiprocessors," Parallel Architectures and Compilation Techniques, 2005. PACT 2005. 14th International Conference on. IEEE, 2005, 12 pages.
Munshi, et al., "A Parameterizable SIMD Stream Processor", In Proceedings of Canadian Conference on Electrical and Computer Engineering, May 1, 2005, pp. 806-811.
Muraoka, et al., "VCore-based design methodology", In Proceedings of the Asia and South Pacific Design Automation Conference, Jan. 21, 2003, pp. 441-445.
Nagarajan et al., "Critical Path Analysis of the TRIPS Architecture," In IEEE International Symposium on Performance Analysis of Systems and Software, Mar. 19, 2006, 11 pages.
Nagarajan et al., "A Design Space Evaluation of Grid Processor Architectures," In Proceedings of the 34th annual ACM/IEEE international symposium on Microarchitecture, Dec. 1, 2001, pp. 40-51.
Nagarajan et al., "Static Placement, Dynamic Issue (SPDI) Scheduling for EDGE Architectures," In Proceedings of the 13th International Conference on Parallel Architecture and Compilation Techniques, Sep. 29, 2004, 11 pages.
Pengfei et al., "M5 Based EDGE Architecture Modeling", In Proceedings of IEEE International Conference on Computer Design, Oct. 3, 2010, pp. 289-296.
Pierce et al., "Wrong-Path Instruction Prefetching", In Proceedings of the 29th Annual IEEE/ACM International Symposium on Microarchitecture, Dec. 2, 1996, pp. 1-17.
Programmatic API for Building Resources, Published on: Nov. 3, 2014; Available at: https://jersey.java.net/documentation/latest/resource-builder.html.
Robatmili et al., "Exploiting Criticality to Reduce Bottlenecks in Distributed Uniprocessors," 17th IEEE International Symposium on High-Performance Computer Architecture (HPCA-17), Feb. 2011, 12 pages.
Roesner, "Counting Dependence Predictors," In Undergraduate Honors Thesis, May 2, 2008, 25 pages.
Sankaralingam, et al., "TRIPS: A Polymorphous Architecture for Exploiting ILP, TLP, and DLP", In Journal of ACM Transactions on Architecture and Code Optimization, vol. 1, No. 1, Mar. 2004, pp. 62-93.
Sarkar, et al., "Understanding POWER Multiprocessors", In Proceedings of the 32nd ACM SIGPLAN Conference on Programming Language Design and Implementation, Jun. 4, 2011, pp. 175-186.
Sethumadhavan et al., "Design and Implementation of the TRIPS Primary Memory System," In Proceedings of International Conference on Computer Design, Oct. 1, 2006, 7 pages.
Smith et al., "Dataflow Predication", In Proceedings of 39th Annual IEEE/ACM International Symposium on Microarchitecture, Dec. 9, 2006, 12 pages.
Souza et al., "Dynamically Scheduling VLIW Instructions", In Journal of Parallel and Distributed Computing, vol. 60, Jul. 2000, pp. 1480-1511.
Wong, et al., "Efficient Methods for Out-of-Order Load/Store Execution for High-Performance soft Processors", In Proceedings of International Conference on Field-Programmable Technology, Dec. 9, 2013, pp. 442-445.
Wu et al., "Block Based Fetch Engine for Superscalar Processors", In Proceedings of the 15th International Conference on Computer Applications in Industry and Engineering, Nov. 7, 2002, 4 pages.

Zmily et al., "Block-Aware Instruction Set Architecture", In Proceedings of ACM Transactions on Architecture and Code Optimization, vol. 3, Issue 3, Sep. 2006, pp. 327-357.
Zmily, et al., "Improving Instruction Delivery with a Block-Aware ISA", In Proceedings of 11th International Euro-Par Conference on Parallel Processing, Aug. 30, 2005, pp. 530-539.
International Search Report and Written Opinion for PCT/US2016/038855, dated Sep. 27, 2016, 14 pages.
Pricopi et al., "Bahurupi: A Polymorphic Heterogeneous Multi-Core Architecture," ACM Trans. Architec. Code Optim. 8, 4, Article 22 (Jan. 2012), 21 pages.
Robatmili et al., "Strategies for Mapping Dataflow Blocks to Disributed Hardware," In 41st IEEE/ACM International Symposium on IEEE, Nov. 8, 2008, pp. 23-34.
Anderson, Michael, "A Framework for Composing High-Performance OpenCL from Python Descriptions", In Technical Report of UCB/EECS-2014-210, Dec. 5, 2014, pp. 1-144, including pp. 41-58.
Appelbe et al., "Hoisting Branch Conditions—Improving Super-Scalar Processor Performance", College of Computer, School of Electrical and Computer Engineering George Institute of Technology, Atlanta, GA, pp. 304-317.
Choudhury, "Visualizing Program Memory Behavior Using Memory Reference Traces", In PhD Theses of University of Utah, Aug. 2012, pp. 1-158, including pp. 15-32.
"Explicit Data Graph Execution", Retrieved on: Aug. 6, 2015, Available at: https://en.wikipedia.org/wiki/Explicit_Data_Graph_Execution, pp. 1-5.
Govindan, "E3:Energy-Efficient EDGE Architectures", In Dissertation, Aug. 2010, pp. 1-244, including pp. 1-12 and 89-124.
Huang, "Improving Processor Performance Through Compiler-Assisted Block Reuse," In Doctoral Dissertation, May 2000, pp. 1-125, including pp. 4-8, 18-53, and 71-86.
Kozumplik, et al., "TRIPS to the Semantic EDGE", Retrieved on: Sep. 22, 2015, Available at: http://vbn.aau.dk/ws/files/61072300/1212050422.pdf, pp. 1-28.
Liu, "Hardware Techniques to Improve Cache Efficiency", In Dissertation of the University of Texas at Austin, May 2009, pp. 1-189, including pp. 105-139.
Maher, "Atomic Block Formation for Explicit Data Graph Execution Architectures", In Dissertation of Doctor of Philosophy, Aug. 2010, pp. 1-185, including pp. 11-33 and 63-120.
McDonald et al., "TRIPS Processor Reference Manual," In Technical Report TR-05-19, document marked Mar. 10, 2005, pp. 1-194, including pp. 7-50 and 190-194.
Microsoft Research, "E2," document downloaded on Apr. 10, 2015 from http://research.microsoft.com/en-us/projects/e2/, pp. 1-2.
PCT Chapter II Demand for International Preliminary Examination and amended claims under Article 34 submitted to the European Patent Office dated Jan. 10, 2017, for PCT/US2016/038855, 6 pages.
Pickett, "Software Method Level Speculation for Java", In Thesis, Apr. 2012, pp. 1-236, including pp. 112-184.
Sankaralingam, "Polymorphous Architectures: A Unified Approach for Extracting Concurrency of Different Granularities", In Doctoral Dissertation of Philosophy, Aug. 2007, pp. 1-276, including pp. 80-112.
Smith, "Explicit Data Graph Compilation," In Thesis, Dec. 2009, pp. 1-201, including pp. 29-62 and 115-138.
Uhlig, "Trap-driven Memory Simulation", In Doctoral Dissertation of Ph.D., Aug. 1995, pp. 1-203, including pp. 113-129.
Written Opinion of the International Preliminary Examining Authority dated May 18, 2017, for PCT/US2016/038855, pp. 1-8.
Zmily, "Block-Aware Instruction Set Architecture", In Doctoral Dissertation, Jun. 2007, pp. 1-176, including pp. 7-23, 42-56, and 61-77.
International Preliminary Report on Patentabiliy Issued in PCT Application No. PCT/US2016/038855 (dated Sep. 27, 2017), pp. 1-14.
"Final Office Action Issued in U.S. Appl. No. 14/752,356", dated Oct. 23, 2017, 21 Pages.
"Final Office Action Issued in U.S. Appl. No. 14/752,636", dated Nov. 13, 2017, 18 Pages.

(56) References Cited

OTHER PUBLICATIONS

"Final Office Action Issued in U.S. Appl. No. 14/752,636", dated Dec. 7, 2018, 18 Pages.
"Non Final Office Action Issued in U.S. Appl. No. 14/752,636", dated Aug. 2, 2018, 17 Pages.
"Final Office Action Issued in U.S. Appl. No. 14/752,660", dated Oct. 19, 2017, 23 Pages.
"Non-Final Office Action Issued in U.S. Appl. No. 14/752,660", dated Oct. 18, 2018, 20 Pages.
"Final Office Action Issued in U.S. Appl. No. 14/942,461", dated Aug. 28, 2018, 12 Pages.
"Non Final Office Action Issued in U.S. Appl. No. 14/942,461", dated Mar. 12, 2018, 15 Pages.
"Office Action Issued in Colombian Patent Application No. NC2017/0013272", dated Jan. 9, 2018, 4 Pages.
"International Search Report and Written Opinion Issued in PCT Application No. PCT/US2016/038845", dated Sep. 30, 2016, 14 Pages.
"International Preliminary Report on Patentability Issued in PCT Application No. PCT/US2016/038853", dated Sep. 18, 2017, 7 Pages.
"International Preliminary Report on Patentability Issued in PCT Application No. PCT/US2016/038854", dated Jun. 6, 2017, 8 Pages.
"International Preliminary Report on Patentability Issued in PCT Application No. PCT/US2016/051208", dated Nov. 17, 2017, 9 Pages.
"International Search Report & Written Opinion Issued in PCT Patent Application No. PCT/US2016/051208", dated Feb. 3, 2017, 18 Pages.
"Second Written Opinion Issued in PCT Application No. PCT/US2016/051208", dated Aug. 9, 2017, 8 Pages.
"Non Final Office Action Issued in U.S. Appl. No. 14/942,461", dated Jan. 18, 2019, 9 Pages.
"Office Action Issued in Chilean Patent Application No. 201703263", dated Jan. 11, 2019, 7 Pages.
"Office Action Issued in Colombian Patent Application No. NC2017/0013272", dated Dec. 4, 2018, 25 Pages.
Oshana, Robert, "Interrupt Management", In Book Software Engineering for Embedded Systems, Apr. 1, 2013, 4 Pages.
"Final Office Action Issued in U.S. Appl. No. 14/752,660", dated May 22, 2019, 23 Pages.
"Office Action Issued in European Patent Application No. 16736332.4", dated Jun. 7, 2019, 6 Pages.
"Office Action Issued in European Patent Application No. 16735791.2", dated May 31, 2019, 10 Pages.
"Office Action issued in European Patent Application No. 16739295.0", dated Aug. 6, 2019, 6 Pages.
"Office Action Issued in Indonesian Patent Application No. P00201709373", dated Jul. 30, 2019, 3 Pages.
"Office Action Issued in European Patent Application No. 16742464.7", dated Aug. 22, 2019, 12 Pages.
"Final Office Action Issued in U.S. Appl. No. 14/942,461", dated Aug. 15, 2019, 22 Pages.
Sankaralingam, et al., "Universal Mechanisms for Data-Parallel Architectures" In the Proceedings of the 36th International Symposium on Microarchitecture, Dec. 5, 2003, 12 Pages.
"Non-Final Office Action Issued in U.S. Appl. No. 14/752,636", dated Aug. 30, 2019, 18 Pages.
"Office Action Issued in Chilean Patent Application No. 201703263", dated Apr. 15, 2019, 7 Pages.
"Non Final Office Action Issued in U.S. Appl. No. 14/752,660", dated Dec. 11, 2019, 21 Pages.
"Final Office Action Issued in U.S. Appl. No. 14/752,636", dated Feb. 21, 2020, 19 Pages.
"Non-Final Office Action Issued in U.S. Appl. No. 14/942,461", dated Apr. 20, 2020, 13 Pages.
"Non-Final Office Action Issued in U.S. Appl. No. 14/752,636", dated Jun. 22, 2020, 23 Pages.
"Search Report Issued in European Application No. 19218262.4", dated Apr. 28, 2020, 11 Pages.
"Office Action issued in European Patent Application No. 16739295.0", dated Jun. 2, 2020, 9 Pages.
"Final Office Action Issued in U.S. Appl. No. 14/942,461", dated Jul. 30, 2020, 26 Pages.
"Office Action Issued in European Patent Application No. 16770614.2", dated Jul. 16, 2020 7 Pages.
"Non-Final Office Action Issued in U.S. Appl. No. 14/942,461", dated Dec. 1, 2020, 30 Pages.
"Office Action Issued in European Patent Application No. 19218262.4", dated Dec. 17, 2020, 10 Pages.
"First Office Action and Search Report Issued in Chinese Patent Application No. 201680036587.9", dated Jan. 6, 2021, 16 Pages.
"First Office Action and Search Report Issued in Chinese Patent Application No. 201680037473.6", dated Oct. 23, 2020, 8 Pages.
"First Office Action and Search Report Issued in Chinese Patent Application No. 201680037476.X", dated Nov. 2, 2020, 8 Pages.
"First Office Action and Search Report Issued in Chinese Patent Application No. 201680037706.2", dated Jan. 6, 2021, 9 Pages.
"Office Action Issued in Indian Patent Application No. 201717044231", dated Feb. 8, 2021, 6 Pages.
Cristal, et al., "Out-of-Order Commit Processors", In Proceedings of the 10th International Symposium on High Performance Computer Architecture, Feb. 14, 2004, 12 Pages.
Maher, et al., "The Good Block: Hardware/Software Design for Composable, Block-Atomic Processors", In Proceedings of the 15th Workshop on Interaction between Compilers and Computer Architectures, Feb. 12, 2011, pp. 9-16.
Ubal, et al., "The Impact of Out-Of-Order Commit in Coarse-Grain, Fine-Grain and Simultaneous Multithreaded Architectures", In Proceedings of the IEEE International Symposium on Parallel and Distributed Processing, Apr. 14, 2008, 11 Pages.
Vijayan, et al., "Out-Of-Order Commit Logic with Precise Exception Handling for Pipelined Processors", In Proceedings of the International Conference on High Performance Computing, 2002, 5 Pages.
"Summons to Attend Oral Proceedings Issued in European Patent Application No. 16770614.2", dated Mar. 23, 2021 11 Pages.
"Office Action issued in Indian Patent Application No. 201717045411", dated Mar. 22, 2021, 7 Pages.
"Second Office Action and Search Report Issued in Chinese Patent Application No. 201680036587.9", dated Aug. 25, 2021, 6 Pages.

* cited by examiner

INSTRUCTION BLOCK ALLOCATION

BACKGROUND

Microprocessors have benefitted from continuing gains in transistor count, integrated circuit cost, manufacturing capital, clock frequency, and energy efficiency due to continued transistor scaling predicted by Moore's law, with little change in associated processor Instruction Set Architectures (ISAs). However, the benefits realized from photolithographic scaling, which drove the semiconductor industry over the last 40 years, are slowing or even reversing. Reduced Instruction Set Computing (RISC) architectures have been the dominant paradigm in processor design for many years. Out-of-order superscalar implementations have not exhibited sustained improvement in area or performance. Accordingly, there is ample opportunity for improvements in processor ISAs to extend performance improvements.

SUMMARY

Methods, apparatus, and computer-readable storage devices are disclosed for throttling processor execution in block-based processor instruction set architectures (BBISA's). In certain examples of the disclosed technology, a block-based processor executes a plurality of two or more instructions as an atomic block. Block-based instructions can be used to express semantics of program data flow and/or instruction flow in a more explicit fashion, allowing for improved compiler and processor performance. In certain examples of the disclosed technology, a block-based processor includes a plurality of block-based processor cores. Functional resources within the block-based processor cores can be allocated to different instruction blocks based on a performance metric which can be determined dynamically or statically. In certain examples of the disclosed technology, an explicit data graph execution instruction set architecture (EDGE ISA), includes information about program control flow that can be leveraged in order to effectively throttle execution of instruction blocks thereby increasing performance and saving energy.

The described techniques and tools for solutions for improving processor performance can be implemented separately, or in various combinations with each other. As will be described more fully below, the described techniques and tools can be implemented in a signal processor, microprocessor, application-specific integrated circuit (ASIC), a soft processor (e.g., a microprocessor implemented in a field programmable gate array (FPGA)), programmable logic, or other suitable logic circuitry. As will be readily apparent to one of ordinary skill in the art, the disclosed technology can be implemented in various computing platforms, including, but not limited to, servers, mainframes, cellphones, smartphones, PDAs, handheld devices, handheld computers, PDAs, touch screen tablet devices, tablet computers, wearable computers, and laptop computers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

DETAILED DESCRIPTION

I. General Considerations

Figure 1:
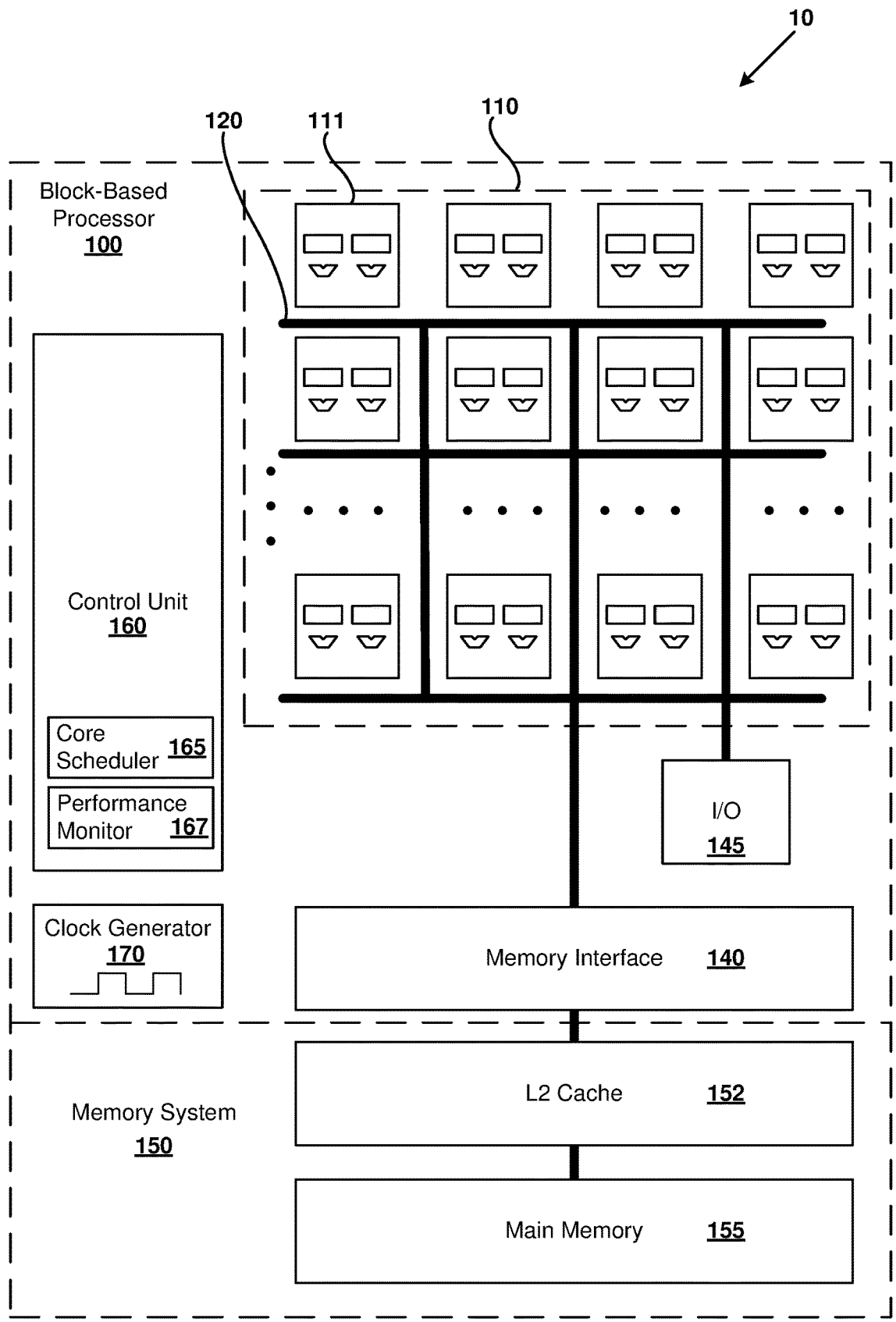
FIG. 1 illustrates a block-based processor, as can be used in some examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., as an agent executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technologies

Superscalar out-of-order microarchitectures employ substantial circuit resources to rename registers, schedule instructions in dataflow order, clean up after miss-speculation, and retire results in-order for precise exceptions. This includes expensive circuits, such as deep, many-ported register files, many-ported content-accessible memories (CAMs) for dataflow instruction scheduling wakeup, and many-wide bus multiplexers and bypass networks, all of which are resource intensive. For example, in FPGA implementations, multi-read, multi-write RAMs may require a mix of replication, multi-cycle operation, clock doubling, bank interleaving, live-value tables, and other expensive techniques.

The disclosed technologies can realize performance enhancement through application of techniques including high instruction-level parallelism (ILP), out-of-order (OoO), superscalar execution, while avoiding substantial complexity and overhead in both processor hardware and associated software. In some examples of the disclosed technology, a block-based processor uses an EDGE ISA designed for area- and energy-efficient, high-ILP execution. In some examples, use of EDGE architectures and associated compilers finesses away much of the register renaming, CAMs, and complexity.

In some examples of the disclosed technology, an apparatus includes a block-based instruction set architecture processor having one or more processing cores configured to fetch and execute a sequence of instruction blocks. Each of the processing cores includes functional resources for performing operations that are specified by instruction headers and instructions within the instruction block. The processor includes one or more core schedulers that are configured to allocate functional resources of the processing cores for performing at least some of the operations specified by the instruction blocks. The functional resources are allocated for executing in the instruction blocks based at least, in part, on a performance metric.

The performance metric can be based on a number of different parameters. For example, the performance metric can be based on branch prediction accuracy, instruction cache misses, instruction cache aliasing, data cache misses, data cache aliasing, memory load conflicts, memory store flushes, or data entropy of data being processed by instruction blocks. In some examples, the performance metric can be based on a tolerance level for energy usage by the processor. In some examples, performance counters within the processor are used to gather data about instruction block usage, which in turn can be used to monitor the performance of the processor, and for adjusting the performance metric used to adjust the allocation of functional resources.

The disclosed techniques can be used with or without speculative execution. In some examples, a scheduler is configured to speculatively initiate instruction fetch, decode, and/or execution for a speculatively allocated block prior to that block being definitively known to execute. In some examples, processor cores can be refreshed, avoiding the need to refresh instruction blocks on those processor cores. In some examples, the scheduler is configured to allocate more functional resources to those instruction blocks that have a higher confidence level.

In some examples of the disclosed technology, a method includes executing a first instruction block with a block-based processor, and prior to completing execution of the first instruction block, initiating allocation of a second instruction block to one or more processor cores based at least in part on a performance metric for the block-based processor.

In some examples of the disclosed technology, a processor performs a method comprising analyzing instructions for a block-based processor to determine probabilities for control flow operations performed using block-based instructions, and emits object code for the blocks of instructions including performance metric data indicating at least one of the determined probabilities. The performance metric data can be encoded in a number of ways including within instruction headers of an instruction block, in a table within the object code, within unused instruction slots in an instruction block, or within fields of instructions.

In some examples of the disclosed technology, instructions organized within instruction blocks are fetched, executed, and committed atomically. Instructions inside blocks execute in dataflow order, which reduces or eliminates using register renaming and provides power-efficient OoO execution. A compiler can be used to explicitly encode data dependencies through the ISA, reducing or eliminating burdening processor core control logic from rediscovering dependencies at runtime. Using predicated execution, intra-block branches can be converted to dataflow instructions, and dependencies, other than memory dependencies, can be limited to direct data dependencies. Disclosed target form encoding techniques allow instructions within a block to communicate their operands directly via operand buffers, reducing accesses to a power-hungry, multi-ported physical register file.

Between instruction blocks, instructions can communicate using memory and registers. Thus, by utilizing a hybrid dataflow execution model, EDGE architectures can still support imperative programming languages and sequential memory semantics, but desirably also enjoy the benefits of out-of-order execution with near in-order power efficiency and complexity.

As will be readily understood to one of ordinary skill in the relevant art, a spectrum of implementations of the disclosed technology are possible with various area and performance tradeoffs.

III. Example Block-Based Processor

FIG. 1 is a block diagram 10 of a block-based processor 100 as can be implemented in some examples of the disclosed technology. The processor 100 is configured to execute atomic blocks of instructions according to an instruction set architecture (ISA), which describes a number of aspects of processor operation, including a register model, a number of defined operations performed by block-based instructions, a memory model, interrupts, and other architectural features. The block-based processor includes a plurality 110 of processing cores, including a processor core 111.

As shown in FIG. 1, the processor cores are connected to each other via core interconnect 120. The core interconnect 120 carries data and control signals between individual ones of the cores 110, a memory interface 140, and an input/output (I/O) interface 145. The core interconnect 120 can transmit and receive signals using electrical, optical, magnetic, or other suitable communication technology and can provide communication connections arranged according to a number of different topologies, depending on a particular desired configuration. For example, the core interconnect 120 can have a crossbar, a bus, point-to-point bus links, or other suitable topology. In some examples, any one of the cores 110 can be connected to any of the other cores, while in other examples, some cores are only connected to a subset of the other cores. For example, each core may only be connected to a nearest 4, 8, or 20 neighboring cores. The core interconnect 120 can be used to transmit input/output data to and from the cores, as well as transmit control signals and other information signals to and from the cores. For example, each of the cores 110 can receive and transmit signals that indicate the execution status of instructions currently being executed by each of the respective cores. In some examples, the core interconnect 120 is implemented as wires connecting the cores 110, register file(s) and memory system, while in other examples, the core interconnect can include circuitry for multiplexing data signals on the interconnect wire(s), switch and/or routing components, including active signal drivers and repeaters, pipeline registers, or other suitable circuitry. In some examples of the disclosed technology, signals transmitted within and to/from the processor 100 are not limited to full swing electrical digital signals, but the processor can be configured to include differential signals, pulsed signals, or other suitable signals for transmitting data and control signals.

In the example of FIG. 1, the memory interface 140 of the processor includes interface logic that is used to connect to additional memory, for example, memory located on another integrated circuit besides the processor 100. As shown in FIG. 1 an external memory system 150 includes an L2 cache 152 and main memory 155. In some examples the L2 cache can be implemented using static RAM (SRAM) and the main memory 155 can be implemented using dynamic RAM (DRAM). In some examples the memory system 150 is included on the same integrated circuit as the other components of the processor 100. In some examples, the memory interface 140 includes a direct memory access (DMA) controller allowing transfer of blocks of data in memory without using register file(s) and/or the processor 100. In some examples, the memory interface manages allocation of virtual memory, expanding the available main memory 155.

The I/O interface 145 includes circuitry for receiving and sending input and output signals to other components, such as hardware interrupts, system control signals, peripheral interfaces, co-processor control and/or data signals (e.g., signals for a graphics processing unit, floating point coprocessor, neural network coprocessor, machine learned model evaluator coprocessor, physics processing unit, digital signal processor, or other co-processing components), clock signals, semaphores, or other suitable I/O signals. The I/O signals may be synchronous or asynchronous. In some examples, all or a portion of the I/O interface is implemented using memory-mapped I/O techniques in conjunction with the memory interface 140.

The block-based processor 100 can also include a control unit 160. The control unit 160 supervises operation of the processor 100. Operations that can be performed by the control unit 160 can include allocation and de-allocation of cores for performing instruction processing, control of input data and output data between any of the cores, the register file(s), the memory interface 140, and/or the I/O interface 145. The control unit 160 can also process hardware interrupts, and control reading and writing of special system registers, for example the program counter stored in one or more register files. In some examples of the disclosed technology, the control unit 160 is at least partially implemented using one or more of the processing cores 110, while in other examples, the control unit 160 is implemented using a non-block-based processing core (e.g., a general-purpose RISC processing core). In some examples, the control unit 160 is implemented at least in part using one or more of: hardwired finite state machines, programmable microcode, programmable gate arrays, or other suitable control circuits. In alternative examples, control unit functionality can be performed by one or more of the cores 110.

The control unit 160 includes a core scheduler 165 that is used to allocate instruction blocks to the processor cores 110. The core scheduler 165 can be implemented using resources of the control unit 160 or using different or additional resources. In some examples, the core scheduler 165 is implemented using a general-purpose processor coupled to memory, the memory being configured to store data for scheduling instruction blocks. In some examples, the core scheduler 165 is implemented using a special purpose processor or using a block-based processor core coupled to the memory. In some examples, the core scheduler 165 is implemented as a finite state machine coupled to the memory. In some examples, an operating system executing on a processor (e.g., a general-purpose processor or a block-based processor core) generates priorities, predictions, and other data that can be used at least in part to schedule instruction blocks with the core scheduler 165. As will be readily apparent to one of ordinary skill in the relevant art, other circuit structures, implemented in an integrated circuit, programmable logic, or other suitable logic can be used to implement hardware for the core scheduler 165.

As used herein, scheduler allocation refers to directing operation of an instruction blocks, including initiating instruction block mapping, fetching, decoding, execution, committing, aborting, idling, and refreshing an instruction block. The recited stages of instruction operation are for illustrative purposes, and in some examples of the disclosed technology, certain operations can be combined, omitted, separated into multiple operations, or additional operations added. The control unit 160 also includes a performance monitor 167 that monitors operation of instruction blocks on the processor cores 110. For example, the performance monitor 167 can count or otherwise gather statistics on metrics of instruction operation that affect performance, including but not limited to, branch prediction accuracy, number of branch mispredicts, instruction cache misses, instruction cache aliasing, data cache misses, data cache aliasing, memory load conflicts, memory store flushes, energy usage, or other such metrics. The metrics gathered by the performance monitor 167 can be used to direct allocation of instruction blocks for example, by increasing or decreasing the number of cores and/or functional resources allocated to a particular instruction block or sequence of instruction blocks.

The core scheduler 165 can be used manage cooperation and/or competition for resources between multiple software threads, including multiple software threads from different processes, that are scheduled to different cores of the same processor. In some examples, multiple threads contend for core resources and the scheduler handles allocation of resources between threads.

In some examples, all threads execute on the processor 100 with the same level of priority. In other examples, the processor can be configured (e.g., by an operating system or parallel runtime executing on the processor) to instruct hardware executing threads to consume more or fewer resources, depending on an assigned priority. In some examples, the scheduler weighs performance metrics for blocks of a particular thread, including the relative priority of the executing threads to other threads, in order to determine allocation of processor resources to each respective thread.

The block-based processor 100 also includes a clock generator 170, which distributes one or more clock signals to various components within the processor (e.g., the cores 110, interconnect 120, memory interface 140, and I/O interface 145). In some examples of the disclosed technology, all of the components share a common clock, while in other examples different components use a different clock, for example, a clock signal having differing clock frequencies. In some examples, a portion of the clock is gated to allowing power savings when some of the processor components are not in use. In some examples, the clock signals are generated using a phase-locked loop (PLL) to generate a signal of fixed, constant frequency and duty cycle. Circuitry that receives the clock signals can be triggered on a single edge (e.g., a rising edge) while in other examples, at least some of the receiving circuitry is triggered by rising and falling clock edges. In some examples, the clock signal can be transmitted optically or wirelessly.

IV. Example Block-Based Processor Core

Figure 2:
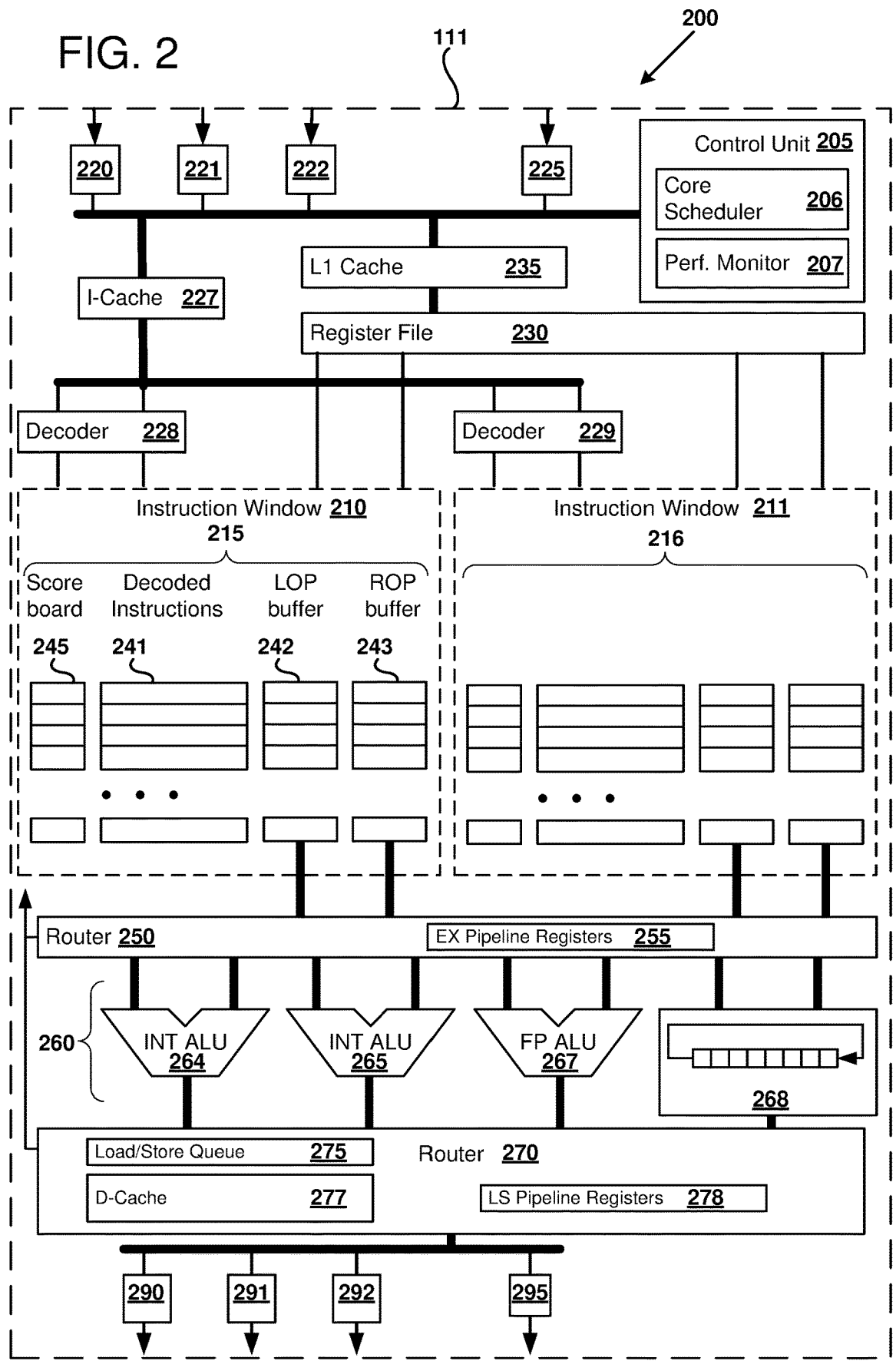
FIG. 2 illustrates a block-based processor core, as can be used in some examples of the disclosed technology.

FIG. 2 is a block diagram 200 further detailing an example microarchitecture for the block-based processor 100, and in particular, an instance of one of the block-based processor cores, as can be used in certain examples of the disclosed technology. For ease of explanation, the exemplary block-based processor core is illustrated with five stages: instruction fetch (IF), decode (DC), operand fetch, execute (EX), and memory/data access (LS). In some examples, for certain instructions, such as floating point operations, various pipelined functional units of various latencies may incur additional pipeline stages. However, it will be readily understood by one of ordinary skill in the relevant art that modifications to the illustrated microarchitecture, such as adding/removing stages, adding/removing units that perform operations, and other implementation details can be modified to suit a particular application for a block-based processor.

As shown in FIG. 2, the processor core 111 includes a control unit 205, which generates control signals to regulate core operation and schedules the flow of instructions within the core using a core-level instruction core scheduler 206. The core-level instruction core scheduler 206 can be used to supplement, or instead of, the processor-level instruction core scheduler 165. The core scheduler 206 can be used to control operation of instructions blocks within the processor core 111 according to similar techniques as those described above regarding the processor-level core scheduler 165. For example, the core scheduler 206 can be implemented using resources of the control unit 205 or using different or additional resources. In some examples, the core scheduler 206 is implemented using a general-purpose processor core and memory being configured to store data for scheduling instruction blocks. In some examples, the core scheduler 206 is implemented as a finite state machine coupled to the memory. In some examples, an operating system executing on a processor (e.g., a general-purpose processor or a block-based processor core) generates priorities, predictions, and other data that can be used at least in part to schedule instruction blocks with the core scheduler 206. As will be readily apparent to one of ordinary skill in the relevant art, other circuit structures, implemented in an integrated circuit, programmable logic, or other suitable logic can be used to implement hardware for the core scheduler 206.

The control unit 205 also includes a performance monitor 207, which can count or otherwise gather statistics on metrics of instruction operation that affect performance for instruction blocks being executed with the processor core 111.

The exemplary processor core 111 includes two instructions windows 210 and 211, each of which can be configured to execute an instruction block. In some examples of the disclosed technology, an instruction block is an atomic collection of block-based-processor instructions that includes an instruction block header and a plurality of one or more instructions. As will be discussed further below, the instruction block header includes information that can be used to further define semantics of one or more of the plurality of instructions within the instruction block. Depending on the particular ISA and processor hardware used, the instruction block header can also be used during execution of the instructions, and to improve performance of executing an instruction block by, for example, allowing for early and/or late fetching of instructions and/or data, improved branch prediction, speculative execution, improved energy efficiency, and improved code compactness. In other examples, different numbers of instructions windows are possible, such as one, four, eight, or other number of instruction windows.

Each of the instruction windows 210 and 211 can receive instructions and data from one or more of input ports 220, 221, and 222 which connect to an interconnect bus and instruction cache 227, which in turn is connected to the instruction decoders 228 and 229. Additional control signals can also be received on an additional input port 225. Each of the instruction decoders 228 and 229 decodes instruction block headers and/or instructions for an instruction block and stores the decoded instructions within a memory store 215 and 216 located in each respective instruction window 210 and 211.

The processor core 111 further includes a register file 230 coupled to an L1 (level one) cache 235. The register file 230 stores data for registers defined in the block-based processor architecture, and can have one or more read ports and one or more write ports. For example, a register file may include two or more write ports for storing data in the register file, as well as having a plurality of read ports for reading data from individual registers within the register file. In some examples, a single instruction window (e.g., instruction window 210) can access only one port of the register file at a time, while in other examples, the instruction window 210 can access one read port and one write port, or can access two or more read ports and/or write ports simultaneously. In some examples, the register file 230 can include 64 registers, each of the registers holding a word of 32 bits of data. (This application will refer to 32-bits of data as a word, unless otherwise specified.) In some examples, some of the registers within the register file 230 may be allocated to special purposes. For example, some of the registers can be dedicated as system registers examples of which include registers storing constant values (e.g., an all zero word), program counter(s) (PC), which indicate the current address of a program thread that is being executed, a physical core number, a logical core number, a core assignment topology, core control flags, a processor topology, or other suitable dedicated purpose. In some examples, there are multiple program counter registers, one or each program counter, to allow for concurrent execution of multiple execution threads across one or more processor cores and/or processors. In some examples, program counters are implemented as designated memory locations instead of as registers in a register file. In some examples, use of the system registers may be restricted by the operating system or other supervisory computer instructions. In some examples, the register file 230 is implemented as an array of flip-flops, while in other examples, the register file can be implemented using latches, SRAM, or other forms of memory storage. The ISA specification for a given processor, for example processor 100, specifies how registers within the register file 230 are defined and used.

In some examples, the processor 100 includes a global register file that is shared by a plurality of the processor cores. In some examples, individual register files associate with a processor core can be combined to form a larger file, statically or dynamically, depending on the processor ISA and configuration.

As shown in FIG. 2, the memory store 215 of the instruction window 210 includes a number of decoded instructions 241, a left operand (LOP) buffer 242, a right operand (ROP) buffer 243, and an instruction scoreboard 245. In some examples of the disclosed technology, each instruction of the instruction block is decomposed into a row of decoded instructions, left and right operands, and scoreboard data, as shown in FIG. 2. The decoded instructions 241 can include partially- or fully-decoded versions of instructions stored as bit-level control signals. The operand buffers 242 and 243 store operands (e.g., register values received from the register file 230, data received from memory, immediate operands coded within an instruction, operands calculated by an earlier-issued instruction, or other operand values) until their respective decoded instructions are ready to execute. In the illustrated example, instruction operands are read from the operand buffers 242 and 243, not the register file. In other examples, the instruction operands can be read from the register file 230.

The memory store 216 of the second instruction window 211 stores similar instruction information (decoded instructions, operands, and scoreboard) as the memory store 215, but is not shown in FIG. 2 for the sake of simplicity. Instruction blocks can be executed by the second instruction window 211 concurrently or sequentially with respect to the first instruction window, subject to ISA constrained and as directed by the control unit 205.

In some examples of the disclosed technology, front-end pipeline stages IF and DC can run decoupled from the back-end pipelines stages (IS, EX, LS). The control unit can fetch and decode two instructions per clock cycle into each of the instruction windows 210 and 211. The control unit 205 provides instruction window dataflow scheduling logic to monitor the ready state of each decoded instruction's inputs (e.g., each respective instruction's predicate(s) and operand (s) using the scoreboard 245. When all of the inputs for a particular decoded instruction are ready, the instruction is ready to issue. The control logic 205 then initiates execution of one or more next instruction(s) (e.g., the lowest numbered ready instruction) each cycle and its decoded instruction and input operands are send to one or more of functional units 260 for execution. The decoded instruction can also encodes a number of ready events. The scheduler in the control logic 205 accepts these and/or events from other sources and updates the ready state of other instructions in the window. Thus execution proceeds, starting with the processor core's 111 ready zero input instructions, instructions that are targeted by the zero input instructions, and so forth.

The decoded instructions 241 need not execute in the same order in which they are arranged within the memory store 215 of the instruction window 210. Rather, the instruction scoreboard 245 is used to track dependencies of the decoded instructions and, when the dependencies have been met, the associated individual decoded instruction is scheduled for execution. For example, a reference to a respective instruction can be pushed onto a ready queue when the dependencies have been met for the respective instruction, and instructions can be scheduled in a first-in first-out (FIFO) order from the ready queue. Information stored in the scoreboard 245 can include, but is not limited to, the associated instruction's execution predicate (such as whether the instruction is waiting for a predicate bit to be calculated and whether the instruction executes if the predicate bit is true or false), availability of operands to the instruction, availability of pipelined function unit issue resources, availability of result write-back resources, or other prerequisites required before issuing and executing the associated individual instruction.

In one embodiment, the scoreboard 245 can include decoded ready state, which is initialized by the instruction decoder 231, and active ready state, which is initialized by the control unit 205 during execution of the instructions. For example, the decoded ready state can encode whether a respective instruction has been decoded, awaits a predicate and/or some operand(s), perhaps via a broadcast channel, or is immediately ready to issue. The active ready state can encode whether a respective instruction awaits a predicate and/or some operand(s), is ready to issue, or has already issued. The decoded ready state can cleared on a block reset or a block refresh. Upon branching to a new instruction block, the decoded ready state and the decoded active state is cleared (a block or core reset). However, when an instruction block is re-executed on the core, such as when it branches back to itself (a block refresh), only active ready state is cleared. Block refreshes can occur immediately (when an instruction block branches to itself) or after executing a number of other intervening instruction blocks. The decoded ready state for the instruction block can thus be preserved so that it is not necessary to re-fetch and decode the block's instructions. Hence, block refresh can be used to save time and energy in loops and other repeating program structures.

The number of instructions that are stored in each instruction window generally corresponds to the number of instructions within an instruction block. In some examples, the number of instructions within an instruction block can be 32, 64, 128, 1024, or another number of instructions. In some examples of the disclosed technology, an instruction block is allocated across multiple instruction windows within a processor core.

Instructions can be allocated and scheduled using the control unit 205 located within the processor core 111. The control unit 205 orchestrates fetching of instructions from memory, decoding of the instructions, execution of instructions once they have been loaded into a respective instruction window, data flow into/out of the processor core 111, and control signals input and output by the processor core. For example, the control unit 250 can include the ready queue, as described above, for use in scheduling instructions. The instructions stored in the memory store 215 and 216 located in each respective instruction window 210 and 211 can be executed atomically. Thus, updates to the visible architectural state (such as the register file 230 and the memory) affected by the executed instructions can be buffered locally within the core 200 until the instructions are committed. The control unit 205 can determine when instructions are ready to be committed, sequence the commit logic, and issue a commit signal. For example, a commit phase for an instruction block can begin when all register writes are buffered, all writes to memory are buffered, and a branch target is calculated. The instruction block can be committed when updates to the visible architectural state are complete. For example, an instruction block can be committed when the register writes are written to as the register file, the stores are sent to a load/store unit or memory controller, and the commit signal is generated. The control unit 205 also controls, at least in part, allocation of functional units 260 to each of the respective instructions windows.

As shown in FIG. 2, a first router 250, which has a number of execution pipeline registers 255, is used to send data from either of the instruction windows 210 and 211 to one or more of the functional units 260, which can include but are not limited to, integer ALUs (arithmetic logic units) (e.g., integer ALUs 264 and 265), floating point units (e.g., floating point ALU 267), shift/rotate logic (e.g., barrel shifter 268), or other suitable execution units, which can including graphics functions, physics functions, and other mathematical operations. Data from the functional units 260 can then be routed through a second router 270 to outputs 290, 291, and 292, routed back to an operand buffer (e.g. LOP buffer 242 and/or ROP buffer 243), to the register file 230, and/or fed back to another functional unit, depending on the requirements of the particular instruction being executed. The second router 270 includes a load/store queue 275, which can be used to buffer memory instructions, a data cache 277, which stores data being input to or output from the core to memory, and load/store pipeline register 278. The router 270 and load/store queue 275 can thus be used to avoid hazards be ensuring: the atomic, all-or-nothing commitment (write to memory) of any stores; stores which may have issued from the core out of order are ultimately written to memory as-if processed in order; and loads which may have issued from the core out of order return data, for each load, reflecting the stores which logically precede the load, and not reflecting the stores which logically follow the load, even if such a store executed earlier, out of order.

The core also includes control outputs 295 which are used to indicate, for example, when execution of all of the instructions for one or more of the instruction windows 215 or 216 has completed. When execution of an instruction block is complete, the instruction block is designated as "committed" and signals from the control outputs 295 can in turn can be used by other cores within the block-based processor 100 and/or by the control unit 160 to initiate scheduling, fetching, and execution of other instruction blocks. Both the first router 250 and the second router 270 can send data back to the instruction (for example, as operands for other instructions within an instruction block).

As will be readily understood to one of ordinary skill in the relevant art, the components within an individual core 200 are not limited to those shown in FIG. 2, but can be varied according to the requirements of a particular application. For example, a core may have fewer or more instruction windows, a single instruction decoder might be shared by two or more instruction windows, and the number of and type of functional units used can be varied, depending on the particular targeted application for the block-based processor. Other considerations that apply in selecting and allocating resources with an instruction core include performance requirements, energy usage requirements, integrated circuit die, process technology, and/or cost.

It will be readily apparent to one of ordinary skill in the relevant art that trade-offs can be made in processor performance by the design and allocation of resources within the instruction window (e.g., instruction window 210) and control logic 205 of the processor cores 110. The area, clock period, capabilities, and limitations substantially determine the realized performance of the individual cores 110 and the throughput of the block-based processor 110.

The core scheduler 206 can have diverse functionality. In certain higher performance examples, the instruction scheduler is highly concurrent. For example, each cycle, the decoder(s) write instructions' decoded ready state and decoded instructions into one or more instruction windows, selects the next instruction or instructions to issue, and, in response the back end sends ready events—either target-ready events targeting a specific instruction's input slot (predicate, left operand, right operand, etc.), or broadcast-ready events targeting all instructions. The per-instruction ready state bits, together with the decoded ready state can be used to determine that the instruction is ready to issue.

In some cases, the core scheduler 206 accepts events for target instructions that have not yet been decoded and must also inhibit reissue of issued ready instructions. In some examples, instructions can be non-predicated, or predicated (based on a true or false condition). A predicated instruction does not become ready until it is targeted by another instruction's predicate result, and that result matches the predicate condition. If the associated predicate does not match, the instruction never issues. In some examples, a predicate predictor unit enables a predicated instruction to issue prior to the execution of an instruction that determine the predicated result value. In some examples, a processor may subsequently check that speculatively issued and executed instructions were correctly speculated. In some examples a misspeculated issued instruction and the specific transitive closure of instructions in the block that consume its outputs may be re-executed, or misspeculated side effects annulled. In some examples, discovery of a misspeculated instruction leads to the complete roll back and re-execution of an entire block of instructions.

Upon branching to a new instruction block that is not already resident in (decoded into) a block's instruction window, the respective instruction window(s) ready state is cleared (a block reset). However when an instruction block branches back to itself (a block refresh), only active ready state is cleared. The decoded ready state for the instruction block can thus be preserved so that it is not necessary to re-fetch and decode the block's instructions. Hence, block refresh can be used to save time and energy in loops.

V. Example Stream of Instruction Blocks

Figure 3:
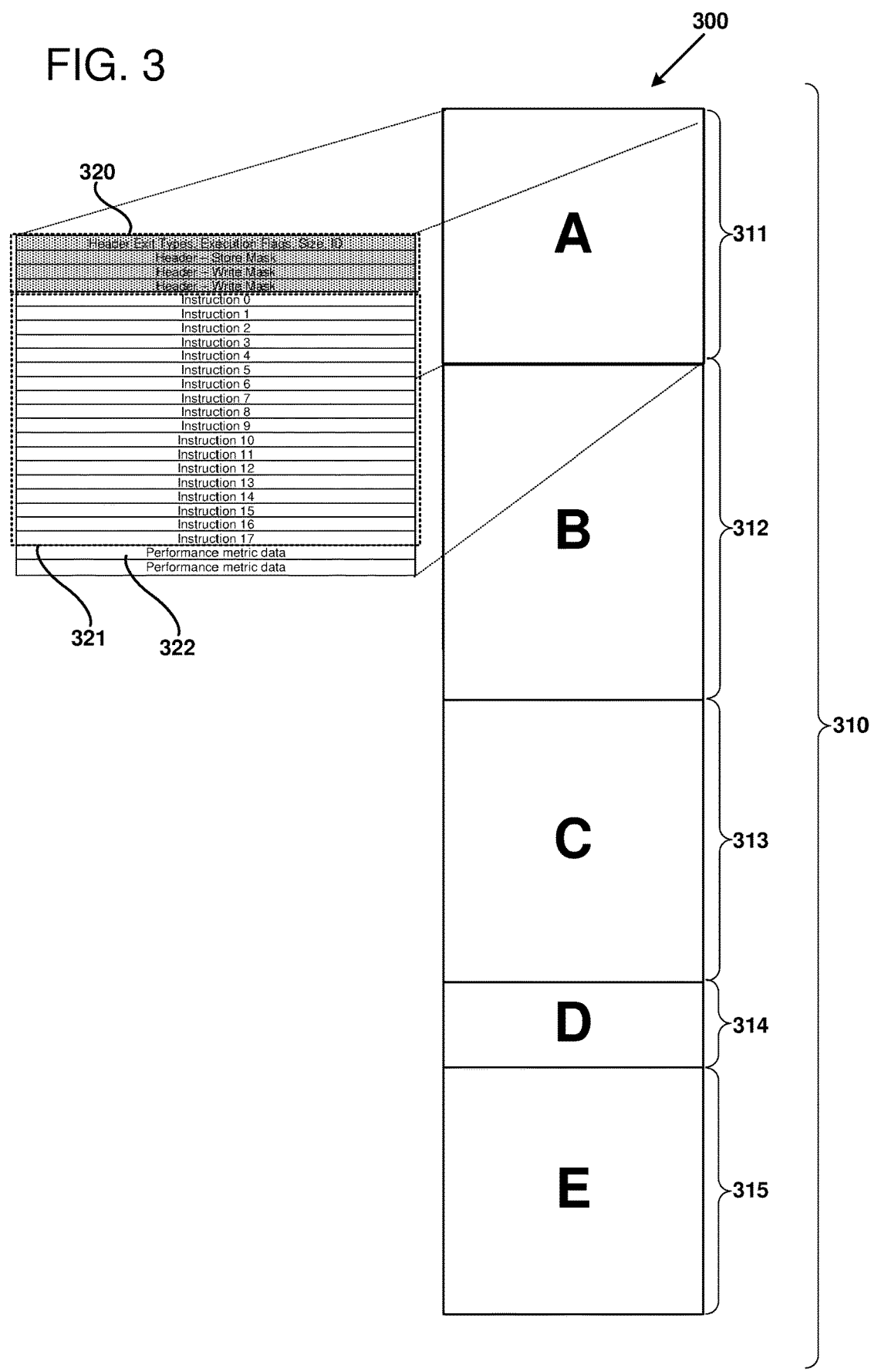
FIG. 3 illustrates a number of instruction blocks, according to certain examples of disclosed technology.

Turning now to the diagram 300 of FIG. 3, a portion 310 of a stream of block-based instructions, including a number of variable length instruction blocks 311-314 is illustrated. The stream of instructions can be used to implement user application, system services, or any other suitable use. In the example shown in FIG. 3, each instruction block begins with an instruction header, which is followed by a varying number of instructions. For example, the instruction block 311 includes a header 320, eighteen instructions 321, and two words of performance metric data 322. The particular instruction header 320 illustrated includes a number of data fields that control, in part, execution of the instructions within the instruction block, and also allow for improved performance enhancement techniques including, for example branch prediction, speculative execution, lazy evaluation, and/or other techniques. The instruction header 320 also includes an ID bit which indicates that the header is an instruction header and not an instruction. The instruction header 320 also includes an indication of the instruction block size. The instruction block size can be in larger chunks of instructions than one, for example, the number of 4-instruction chunks contained within the instruction block. In other words, the size of the block is divided by 4 (e.g., shifted right two bits) in order to compress header space allocated to specifying instruction block size. Thus, a size value of 0 indicates a minimally-sized instruction block which is a block header followed by four instructions. In some examples, the instruction block size is expressed as a number of bytes, as a number of words, as a number of n-word chunks, as an address, as an address offset, or using other suitable expressions for describing the size of instruction blocks. In some examples, the instruction block size is indicated by a terminating bit pattern in the instruction block header and/or footer.

The instruction block header 320 can also include execution flags, which indicate special instruction execution requirements. For example, branch prediction or memory dependence prediction can be inhibited for certain instruction blocks, depending on the particular application.

In some examples of the disclosed technology, the instruction header 320 includes one or more identification bits that indicate that the encoded data is an instruction header. For example, in some block-based processor ISAs, a single ID bit in the least significant bit space is always set to the binary value 1 to indicate the beginning of a valid instruction block. In other examples, different bit encodings can be used for the identification bit(s). In some examples, the instruction header 320 includes information indicating a particular version of the ISA for which the associated instruction block is encoded.

The block instruction header 320 can also include a number of block exit types for use by, for example, branch prediction, control flow determination, and/or bad jump detection. The exit type can indicate what the type of branch instructions are, for example: sequential branch instructions, which point to the next contiguous instruction block in memory; offset instructions, which are branches to another instruction block at a memory address calculated relative to an offset; subroutine calls, or subroutine returns. By encoding the branch exit types in the instruction header, the branch predictor can begin operation, at least partially, before branch instructions within the same instruction block have been fetched and/or decoded.

The instruction block header 320 also includes a store mask which identifies the load-store queue identifiers that are assigned to store operations. The instruction block header can also include a write mask, which identifies which global register(s) the associated instruction block will write. The associated register file must receive a write to each entry before the instruction block can complete. In some examples, a block-based processor architecture can include not only scalar instructions, but also single-instruction multiple-data (SIMD) instructions, that allow for operations with a larger number of data operands within a single instruction.

In some examples, performance metric data 321 includes information that can be used to calculate confidence values that in turn can be used to allocate an associated instruction block to functional resources of one or more processor cores. For example, the performance metric data 322 can include indications of branch instructions in the instruction block that are more likely to execute, based on dynamic and/or static analysis of the operation of the associated instruction block 311. For example, a branch instruction associated with a for loop that is executed for a large immediate value of iterations can be specified as having a high likelihood of being taken. Branch instructions with low probabilities can also be specified in the performance metric data 322. Performance metric data encoded in the instruction block can also be generated using performance counters to gather statistics on actual execution of the instruction block. In some examples, performance metric data is retained over time in a cache or in a branch predictor history table.

The instruction block header 320 can also include similar information as the performance metric data 321 described above, but adapted to be included within the header.

VI. Example Block Instruction Target Encoding

Figure 4:
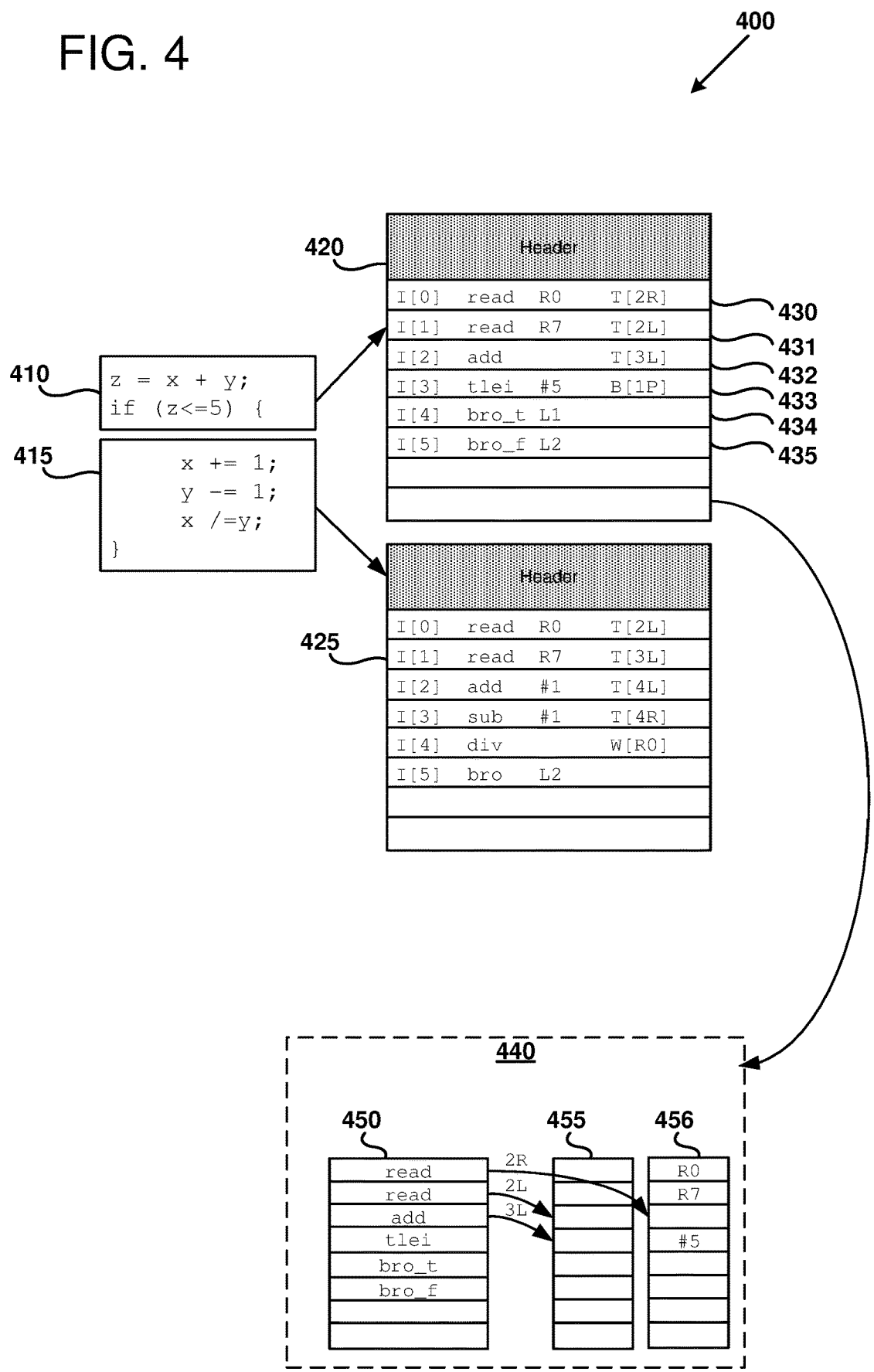
FIG. 4 illustrates portions of source code and instruction blocks, as can be used in some examples of the disclosed technology.

FIG. 4 is a diagram 400 depicting an example of two portions 410 and 415 of C language source code and their respective instruction blocks 420 and 425, illustrating how block-based instructions can explicitly encode their targets. In this example, the first two READ instructions 430 and 431 target the right (T[2R]) and left (T[2L]) operands, respectively, of the ADD instruction 432. In the illustrated ISA, the read instruction is the only instruction that reads from the global register file (e.g., register file 160); however any instruction can target, the global register file. When the ADD instruction 432 receives the result of both register reads it will become ready and execute.

When the TLEI (test-less-than-equal-immediate) instruction 433 receives its single input operand from the ADD, it will become ready and execute. The test then produces a predicate operand that is broadcast on channel one (B[1P]) to all instructions listening on the broadcast channel, which in this example are the two predicated branch instructions (BRO_T 434 and BRO_F 435). The branch that receives a matching predicate will fire.

A dependence graph 440 for the instruction block 420 is also illustrated, as an array 450 of instruction nodes and their corresponding operand targets 455 and 456. This illustrates the correspondence between the block instructions 420, the corresponding instruction window entries, and the underlying dataflow graph represented by the instructions. Here decoded instructions READ 430 and READ 431 are ready to issue, as they have no input dependencies. As they issue and execute, the values read from registers R6 and R7 are written into the right and left operand buffers of ADD 432, marking the left and right operands of ADD 432 "ready." As a result, the ADD 432 instruction becomes ready, issues to an ALU, executes, and the sum is written to the left operand of TLEI 433.

VII. Example Block-Based Instruction Formats

Figure 5:
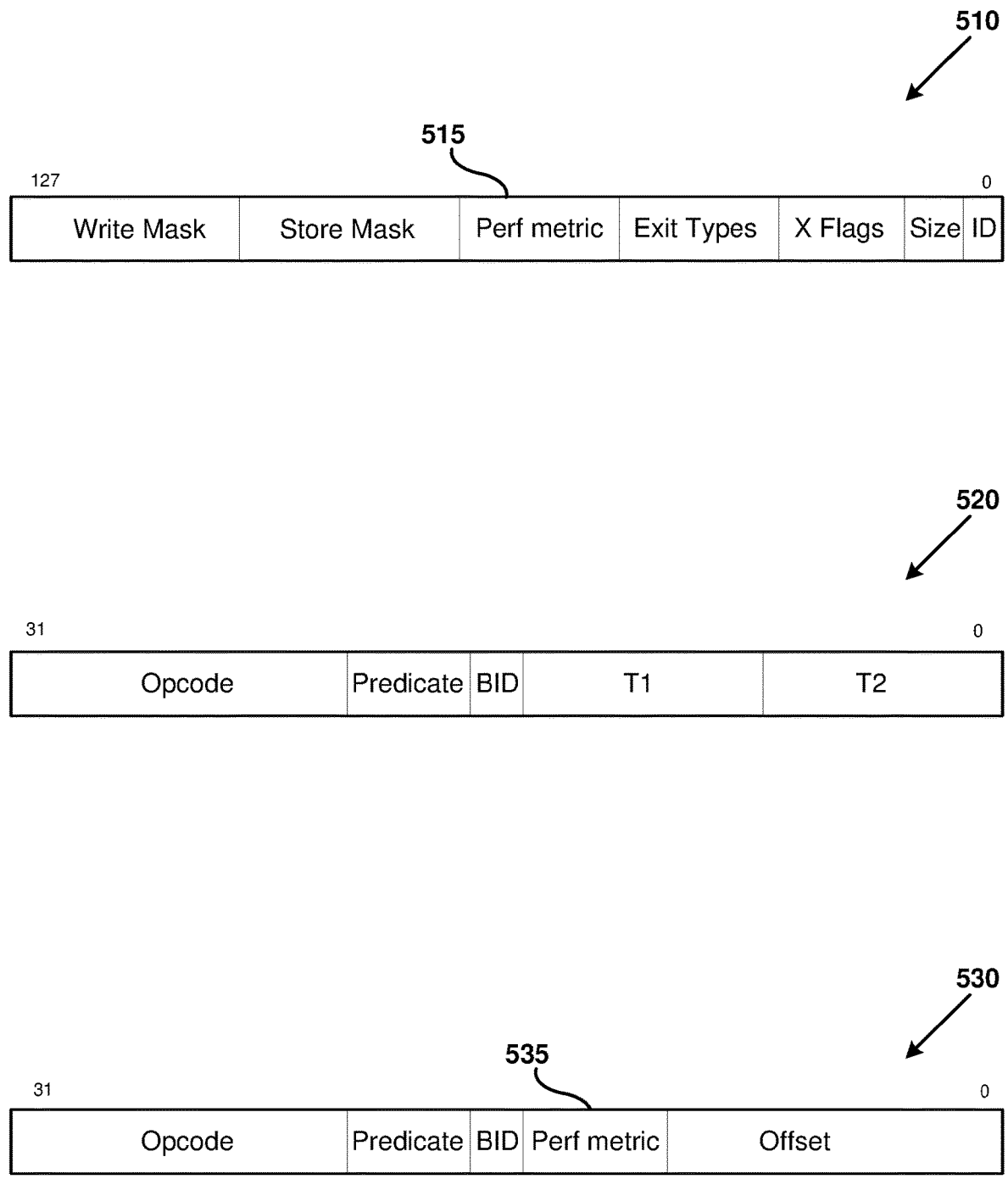
FIG. 5 illustrates block-based processor headers and instructions, as can be used in some examples of the disclosed technology.

FIG. 5 is a diagram illustrating generalized examples of instruction formats for an instruction header 510, a generic instruction 520, and a branch instruction 530. Each of the instruction headers or instructions is labeled according to the number of bits. For example, the instruction header 510 includes four 32-bit words and is labeled from its least significant bit (lsb) (bit 0) up to its most significant bit (msb) (bit 127). As shown, the instruction header includes a write mask field, a store mask field, a performance metric field 515, a number of exit type fields, a number of execution flag fields, an instruction block size field, and an instruction header ID bit (the least significant bit of the instruction header). The performance metric field 515 includes data that can be used by a processor core scheduler to better allocate operations for performing the instruction block. For example, the performance metric field 515 can indicate whether and/or which of the branch instructions with the instruction block associated with the instruction header 510 are likely to be taken, or a confidence level associated with one or more of the branch instructions being taken.

The illustrated generic block instruction 520 is stored as one 32-bit word and includes an opcode field, a predicate field, a broadcast ID field (BID), a first target field (T1), and a second target field (T2). For instructions with more consumers than target fields, a compiler can build a fanout tree using move instructions, or it can assign high-fanout instructions to broadcasts. Broadcasts support sending an operand over a lightweight network to any number of consumer instructions in a core. A broadcast identifier can be encoded in the generic block instruction 520.

While the generic instruction format outlined by the generic instruction 520 can represent some or all instructions processed by a block-based processor, it will be readily understood by one of skill in the art that, even for a particular example of an ISA, one or more of the instruction fields may deviate from the generic format for particular instructions. The opcode field specifies the operation(s) performed by the instruction 520, such as memory read/write, register load/store, add, subtract, multiply, divide, shift, rotate, system operations, or other suitable instructions. The predicate field specifies the condition under which the instruction will execute. For example, the predicate field can specify the value "true," and the instruction will only execute if a corresponding condition flag matches the specified predicate value. Thus, a predicate field specifies, at least in part, a true or false condition that is compared to the predicate result from executing a second instruction that computes a predicate result and which targets the instruction, to determine whether the first instruction should issue. In some examples, the predicate field can specify that the instruction will always, or never, be executed. Thus, use of the predicate field can allow for denser object code, improved energy efficiency, and improved processor performance, by reducing the number of branch instructions.

The target fields T1 and T2 specifying the instructions to which the results of the block-based instruction are sent. For example, an ADD instruction at instruction slot 5 can specify that its computed result will be sent to instructions at slots 3 and 10. In some examples, the result will be sent to specific left or right operands of slots 3 and 10. Depending on the particular instruction and ISA, one or both of the illustrated target fields can be replaced by other information, for example, the first target field T1 can be replaced by an immediate operand, an additional opcode, specify two targets, etc.

The branch instruction 530 includes an opcode field, a predicate field, a broadcast ID field (BID), a performance metric field 535, and an offset field. The opcode and predicate fields are similar in format and function as described regarding the generic instruction. The offset can be expressed in four instruction blocks in some examples, thus extending the memory address range over which a branch can be executed. The predicate shown with the generic instruction 520 and the branch instruction 530 can be used to avoid additional branching within an instruction block. For example, execution of a particular instruction can be predicated on the result of a previous instruction (e.g., a comparison of two operands). If the predicate is false, the instruction will not commit values calculated by the particular instruction. The performance metric field 535 includes data that can be used by a processor core scheduler to better allocate operations for performing the instruction block. For example, the performance metric field 535 can indicate whether the branch instruction 530 is likely to be taken, or a confidence level associated with the branch instruction being taken.

It should be readily understood that, as used herein, the term "branch instruction" is not limited to changing program execution to a relative memory location, but also includes jumps to an absolute or symbolic memory location, subroutine calls and returns, and other instructions that can modify the execution flow. In some examples, the execution flow is modified by changing the value of a system register (e.g., a program counter PC or instruction pointer), while in other examples, the execution flow can be changed by modifying a value stored at a designated location in memory. In some examples, a jump register branch instruction is used to jump to a memory location stored in a register. In some examples, subroutine calls and returns are implemented using jump and link and jump register instructions, respectively.

It should be readily apparent that although encoded performance metric data is depicted as being encoded in multiple places (e.g., in an instruction block header, in instruction slots for a block-based processor, within particular instructions, etc.) that in many examples the performance metric will only be stored in one location, if it is stored within object code at all.

VIII. Example Processor State Diagram

Figure 6:
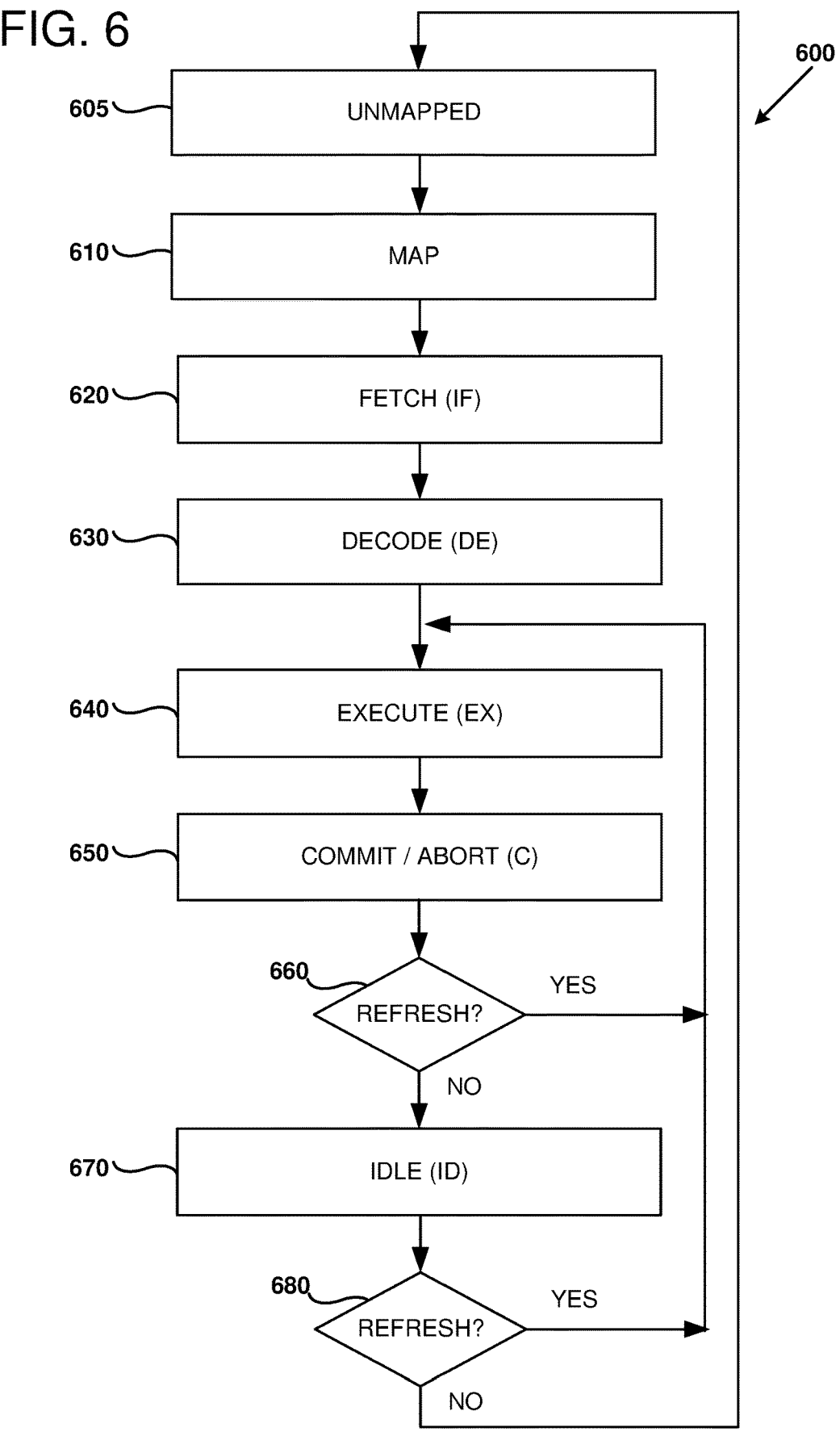
FIG. 6 illustrates a state diagram for an instruction block, as can be used in some examples of the disclosed technology.

FIG. 6 is a state diagram 600 illustrating number of states assigned to an instruction block as it is mapped, executed, and retired. It should be readily understood that the states shown in FIG. 6 are for one example of the disclosed technology, but that in other examples an instruction block may have additional or fewer states, as well as having different states than those depicted in the state diagram 600. At state 605, an instruction block is unmapped. The instruction block may be resident in memory coupled to a block-based processor, stored on a computer-readable storage device such as a hard drive or a flash drive, and can be local to the processor or located at a remote server and accessible using a computer network. The unmapped instructions may also be at least partially resident in a cache memory coupled to the block-based processor.

At instruction block map state 610, control logic for the block-based processor, such as an instruction scheduler, can be used to monitor processing core resources of the block-based processor and map the instruction block to one or more of the processing cores.

The control unit can map one or more of the instruction block to processor cores and/or instruction windows of particular processor cores. In some examples, the control unit monitors processor cores that have previously executed a particular instruction block and can re-use decoded instructions for the instruction block still resident on the "warmed up" processor core. Once the one or more instruction blocks have been mapped to processor cores, the instruction block can proceed to process block 620.

When the instruction block is in the fetch state 620 (e.g., instruction fetch), the mapped processor core fetches computer-readable block instructions from the block-based processors' memory system and loads them into a memory associated with a particular processor core. For example, fetched instructions for the instruction block can be fetched and stored in an instruction cache within the processor core. The instructions can be communicated to the processor core using core interconnect. Once at least one instruction of the instruction block has been fetched, the instruction block can enter the instruction decode state 630.

During the instruction decode state 630, various bits of the fetched instruction are decoded into signals that can be used by the processor core to control execution of the particular instruction. For example, the decoded instructions can be stored in the memory 241 shown above, in FIG. 2. The decoding includes generating dependencies for the decoded instruction, operand information for the decoded instruction, and targets for the decoded instruction. Once at least one instruction of the instruction block has been decoded, the instruction block can proceed to execution state 640.

During the execution state 640, operations associated with the instruction are performed using, for example, functional units 260 as discussed above regarding FIG. 2. As discussed above, the functions performed can include arithmetical functions, logical functions, branch instructions, memory operations, and register operations. Control logic associated with the processor core monitors execution of the instruction block, and once it is determined that the instruction block can either be committed, or the instruction block is to be aborted, the instruction block state is set to commit/abort 650.

At the commit/abort state 650, the processor core control unit determines that operations performed by the instruction block can be completed. For example memory load store operations, register read/writes, branch instructions, and other instructions will definitely be performed according to the control flow of the instruction block. Alternatively, if the instruction block is to be aborted, for example, because one or more of the dependencies of instructions are not satisfied, or the instruction was speculatively executed on a predicate for the instruction block that was not satisfied, the instruction block is aborted so that it will not affect the state of the sequence of instructions in memory or the register file. Regardless of whether the instruction block has committed or aborted, the instruction block goes to state 660 to determine whether the instruction block should be refreshed. If the instruction block is refreshed, the processor core re-executes the instruction block, typically using new data values, particularly the registers and memory updated by the just-commited execution of the block, and proceeds directly to the execute state 640. Thus, the time and energy spent in mapping, fetching, and decoding the instruction block can be avoided. Alternatively, if the instruction block is not to be refreshed, then the instruction block enters an idle state 670.

In the idle state 670, the processor core executing the instruction block can be idled by, for example, powering down hardware within the processor core, while maintaining at least a portion of the decoded instructions for the instruction block. At some point, the control unit determines whether the idle instruction block on the processor core is to be refreshed or not. If the idle instruction block is to be refreshed, the instruction block can resume execution at execute state 640. Alternatively, if the instruction block is not to be refreshed, then the instruction block is unmapped and the processor core can be flushed and subsequently instruction blocks can be mapped to the flushed processor core.

While the state diagram 600 illustrates the states of an instruction block as executing on a single processor core for ease of explanation, it should be readily understood to one of ordinary skill in the relevant art that in certain examples, multiple processor cores can be used to execute multiple instances of a given instruction block, concurrently.

IX. Example Block-Based Processor and Memory

Figure 7:
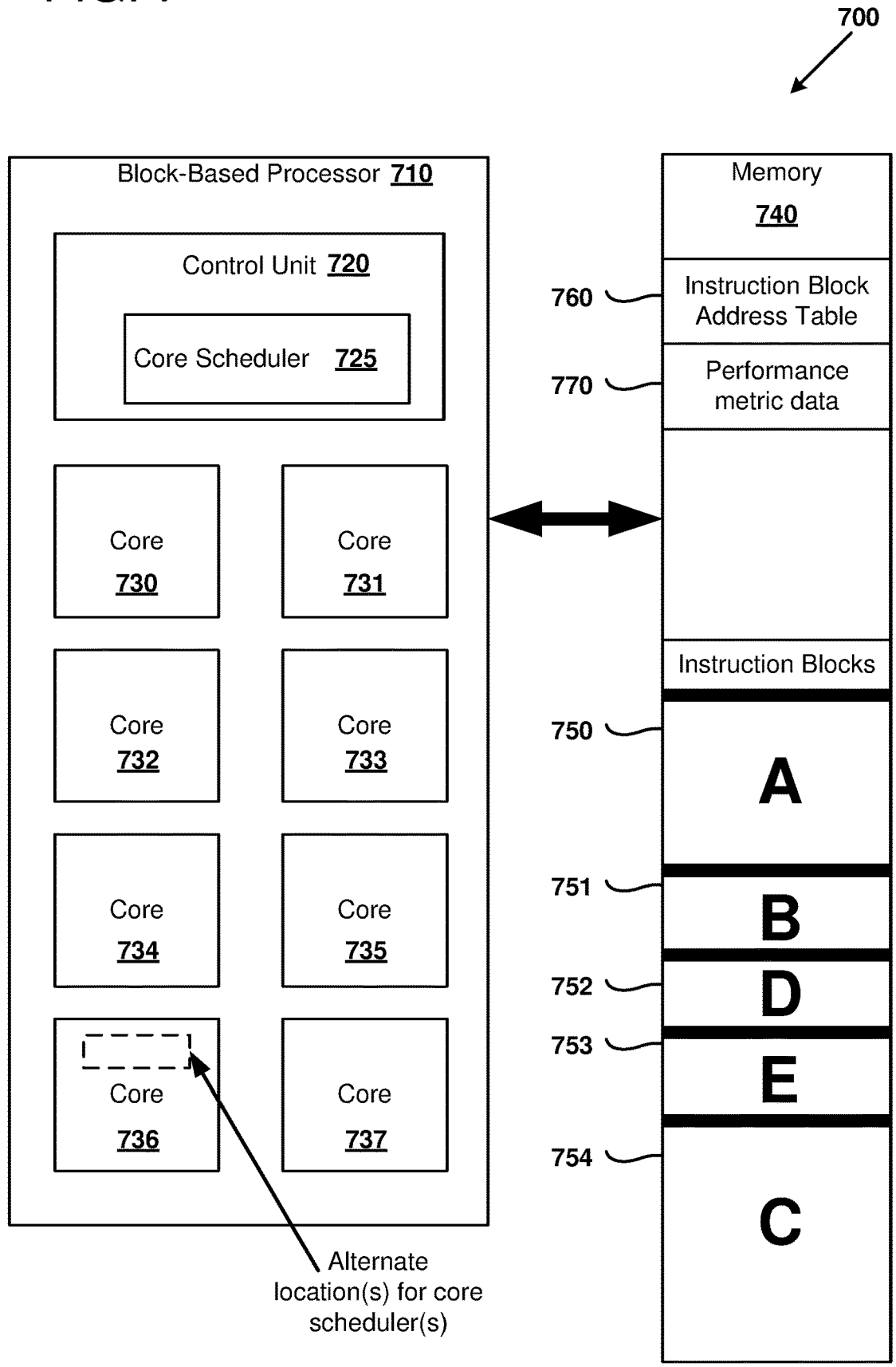
FIG. 7 is a diagram illustrating a block-based processor and memory, as can be used in some examples of the disclosed technology.

FIG. 7 is a diagram 700 illustrating an apparatus comprising a block-based processor 710, having a control unit 720 to supervise operation of the processor, which control unit includes a core scheduler 725 that can be used to map, allocate, and initiate fetch, decode, and execute instructions for cores of the block based processor 710. The illustrated block-based processor 710 has 8 cores, but in other examples there could be 1, 2, 4, 16, 64, 512, 1,024, or any other suitable number of block-based processor cores (730, 731, 732, 733, 734, 735, 736, 737). The processor cores 730-737 are configured to fetch, execute, and retire a sequence of instruction blocks. Each of the processing core includes functional resources for performing operations specified by instruction headers and block instructions stored in the instruction blocks. The core scheduler 725 is configured to allocate functional resources for performing the processor core operations according to the instructions and associated instruction headers. The core scheduler can allocate processor cores, and/or functional resources of the processor cores, for executing the sequence of instruction blocks based at least in part on a performance metric.

The block-based processor 710 is coupled to a memory 740 which stores object code for a number of instruction blocks 750-754. In some examples of the disclosed technology, an instruction block address table 760 can be stored in memory, or built dynamically at run time, to indicate, legal addresses for the beginning of executing instruction blocks, in addition to, or instead of, using an instruction block header to indicate valid branch target locations at the start of the instruction blocks 750-754. The memory 740 can also store performance metric data in some examples of the disclosed technology. For example, the performance metric data can include probabilities and/or statistics regarding the probability that particular branch instructions within the instruction blocks 750-754 will be taken or not taken. In some examples, a compiler used to emit object code for the instruction blocks analyzes the control flow of the sequence of instructions and generates predictions for the likelihood of particular branch targets being taken or not taken, and encodes this data as a portion of the performance metric data. In some examples, a profiler application is used to execute the instruction blocks and gather statistical data indicating the likelihood that particular control flow instructions within the instruction blocks will be executed. In some examples, statistics can be generated using data acquired from a performance monitor 727 located within the block-based processor 710.

Although the control unit 720 is illustrated as being a central control unit for the entire block-based processor, in other examples, all or a portion of the control unit can be implemented in logic distributed across one or more of the processing cores 730-737. The performance metrics can also be determined using hardware within the control unit 720, instead of, or to supplement, the performance metric data 770 stored in the memory 740. Examples of performance metrics that can be used to configure the allocation of functional resources include, but are not limited to: branch prediction accuracy for branch instructions, instruction cache misses, instruction cache aliasing, data cache misses, data cache aliasing, memory load conflicts, memory store flushes, or data entropy. The metrics can be expressed in a number of ways, including as an absolute count or as a rate. Another example of a suitable performance metric is a tolerance level for energy usage by the processor. For example a processor can be allocated an energy usage budget expressed in, for example, a number of milliwatts or clock cycles, and the core scheduler 725 in turn adjusts the allocation of the functional resources based on the allocated energy budget. In some examples, the tolerance level for energy usage is adjusted based on whether the processor is being powered by a battery or by a fixed power supply, such as an AC power adaptor.

The core scheduler 725 can allocate functional resources in a number of ways. For example, the number of processor cores used to execute a particular sequence of instruction blocks can be adjusted. As another example, the core scheduler 725 can throttle execution of a particular processor core to speculatively or eagerly proceed to execute a portion of an instruction block up to a particular instruction block state. For example, a core can be directed to fetch and decode an instruction block, but not to execute the instruction block, until a later point in time. For example, the core scheduler 725 can suppress execution of instruction blocks until the probability that the instruction block will definitely be executed surpasses a predetermined threshold. The core scheduler 725 can be implemented as a processor-level core scheduler (e.g., similar to core scheduler 165) or as a core-level core scheduler (e.g., similar to core scheduler 206).

As used herein, the term branch instruction is not limited to relative branches (e.g., where the target location is designated as an offset from the current program counter value), unless stated otherwise. For example, branch instructions include: branches relevant to an offset value, absolute branches (jumps) to a memory address, subroutine calls, subroutine returns, or other suitable forms of changing execution flow of a sequence of instructions within a block-based processor.

Figure 8:
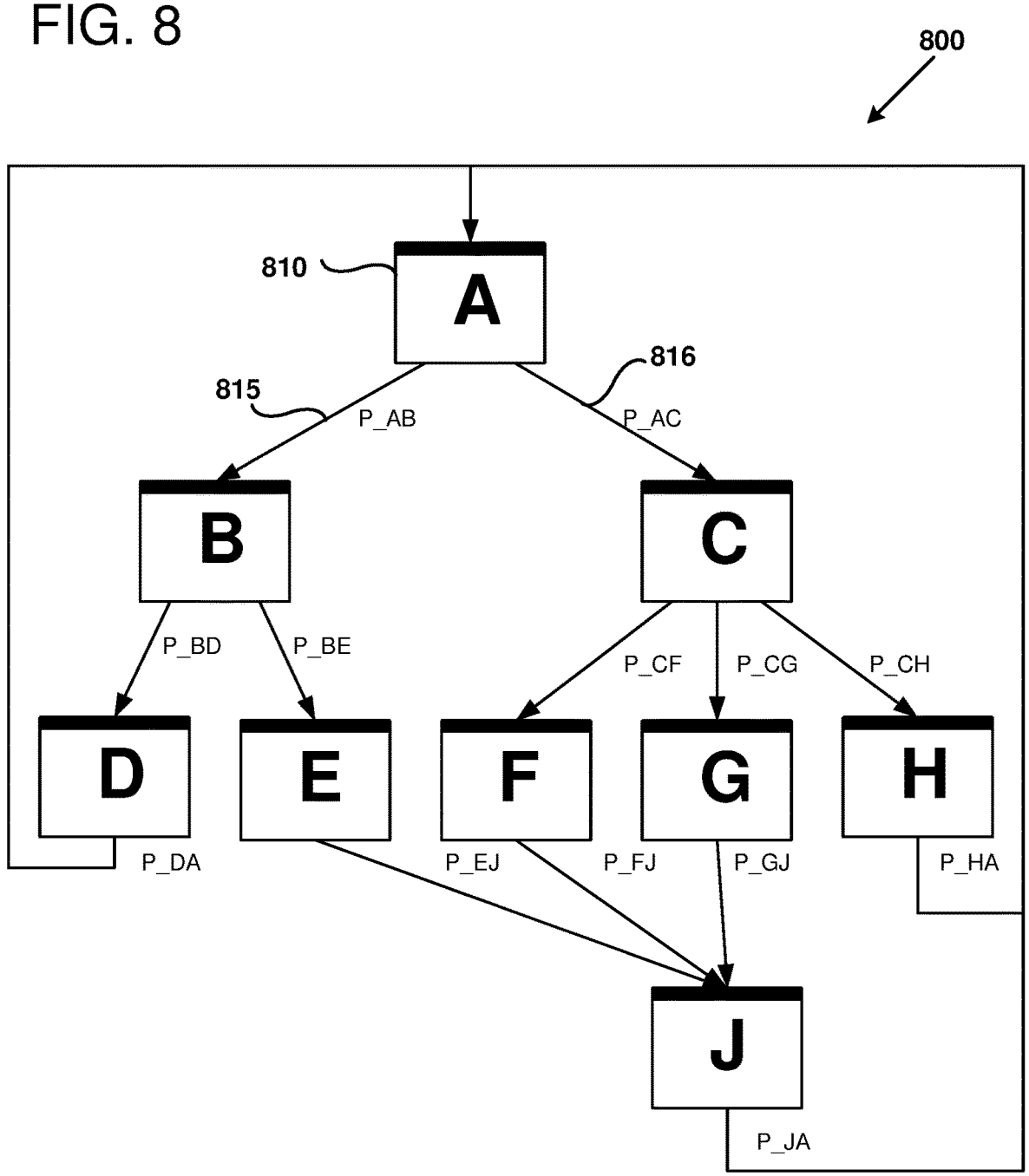
FIG. 8 is a control flow graph for a sequence of instruction blocks, as can be used in some examples of the disclosed technology.

X. Example Control Flow Diagram for an Example Sequence of Instruction Blocks FIG. 8 is a control flow diagram 800 representing control flow for a sequence of instruction blocks that can be executed using a block-based processor according to the disclosed technology. Each of the instruction blocks is represented by a letter A through H or J. Each of the instruction blocks is depicted with one or more control flow edges extending from the instruction block to one of its corresponding target location instruction blocks. A control flow edge is created for one or more branch instructions within an instruction block. For example, instruction block A 810 has two possible target locations: instruction block B, which is accessed by control flow edge 815, and instruction block C, which is accessed by control edge 816. Each of the control flow edges in the control flow graph 800 have an associated confidence associated with the edge that represents the likelihood that the parent instruction block will take a particular branch when the instruction block is executed. For example, P_AB denotes the probability for control flow edge 815, and P_AC denotes the probability associated with control flow edge 816. In some examples, a table of control flow edges and their corresponding confidence or probability levels can be expressed as in a table, as shown in Table 1 below.

TABLE 1

| Edge | Confidence |
|---|---|
| P_AB | 0.95 |
| P_AC | 0.05 |
| P_BD | 0.5 |
| P_BE | 0.5 |
| P_CF | 0.9 |
| P_CG | 0.05 |
| P_CH | 0.05 |
| P_EJ | 1.0 |
| P_FJ | 1.0 |
| P_GJ | 1.0 |
| P_DA | 1.0 |
| P_HA | 1.0 |
| P_JA | 1.0 |

As shown in Table 1 above, probability edge P_AB has a confidence level of 0.95, while control flow edge P_AC has a confidence level of 0.05. This might be the case if, for example, a compiler that generated the instruction block determined that control flow edge AB is much more likely to be taken because it is within a loop having many iterations, or based on performance data gathered by previously executing a sequence of instructions including the instruction block A, B, and C. Alternatively, confidence levels for control flow edges can be determined dynamically at run time, for example, by using performance counters to measure control flow data such as branch prediction accuracy, or count a number of branch mispredictions. Some of the instructions blocks only have one control flow edge because there is only one target location possible for exiting that particular instruction block. For example, control flow edge EJ has a probability of 1.0 because instruction block E has only one target location, instruction block J.

In some examples of the disclosed technology, table data is partially populated, or there are select "indeterminate" entries. In some examples, there are computed indirect branches to diverse blocks that do not have assigned priorities. In some examples, there are computed indirect branches to diverse blocks that do have priorities. In some examples, probabilities between blocks may be context-sensitive. For example, probability P_AC_CD (the assigned probability of C→D after A→C) may be 0.8 whereas P_BC_CD (the assigned probability of C→D after B→C) may be 0.2.

Probabilities associated with the control flow edges can be used as described herein. Further, instruction headers for the instruction block can encode information that is useful in constructing a control flow graph for a sequence of instructions at run time. Further, at least some of the block instructions have control flow and/or operand flow expressed either implicitly or explicitly, and this information encoded within the block instructions can also be used to generate the control flow graph, and in turn determine confidence levels for control flow edges.

XI. Example Method of Allocating Functional Resources

Figure 9:
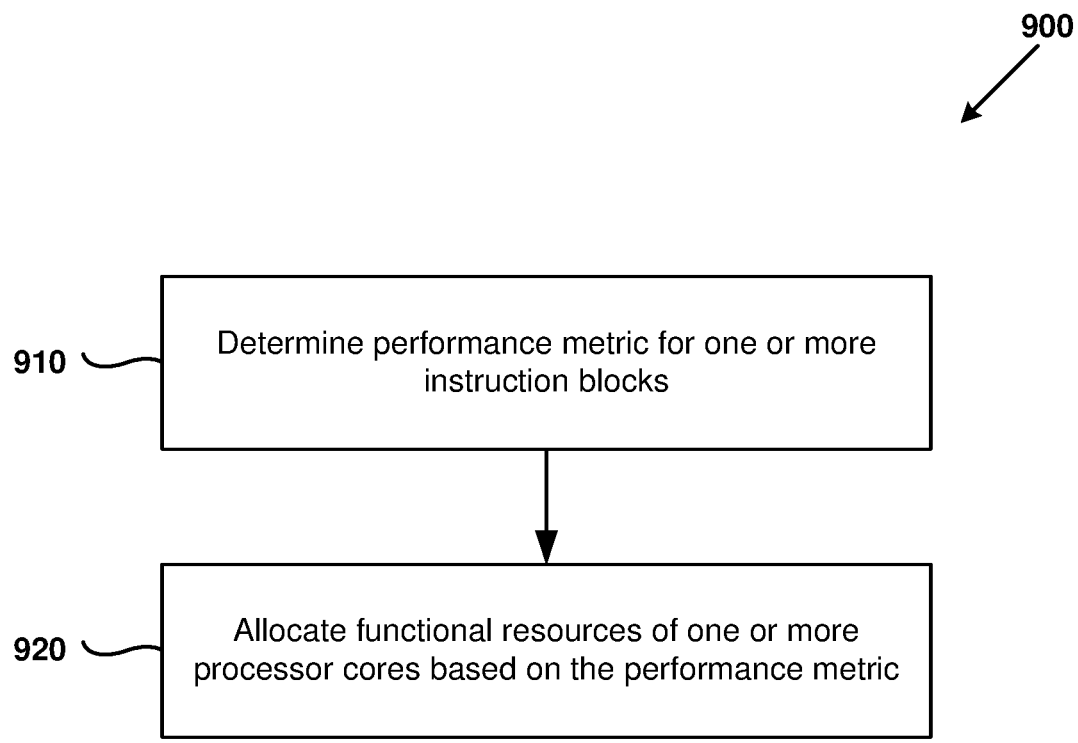
FIG. 9 is a flowchart illustrating an example method of allocating functional resources according to a performance metric, as can be performed in some examples of the disclosed technology.

FIG. 9 is a flowchart 900 illustrating a method of allocating functional resources as can be used in certain examples of the disclosed technology. The example method depicted in the flow chart 900 can be implemented using, for example, a block-based processor (e.g., block-based processor 100) executing blocks of instructions.

At process block 910, a performance metric is determined for one or more instruction blocks in a sequence. The performance metric can be based on one or more parameters, for example: branch prediction accuracy, number of branch mispredictions, instruction cache misses, instruction cache aliasing, data cache misses, data cache aliasing, memory load conflicts, memory store flushes, or data entropy. In some examples, the performance metric is based at least in part on a tolerance level for energy usage by the processor. In some examples, the performance metric is determined dynamically at run time. In some examples, the performance metric is determined based at least in part on analysis of control flow of a sequence of instruction blocks. In some examples, the performance metric is based at least in part on data or specifications provided by a programmer who provides instruction blocks. In some examples, the performance metric is encoded within an instruction block's instruction header and/or one or more of its composing instructions. In some examples, a performance counter is used to derive the performance metric. In some examples, the performance metric can be updated periodically, intermittently, or continuously as a sequence of instructions is executed by a block-based processor. In some examples, e.g., a parallel runtime library, in which scheduling software cooperates with scheduler hardware to provide performance metrics, scheduling hints and/or overrides, instructions compute performance metrics and communicate them to the scheduler. Once a performance metric has been determined, the method proceeds to process block 920.

At process block 920, functional resources of one or more block-based processor cores are allocated based at least in part on the performance metric determined at process block 910. For example, functional resources can be allocated by a core scheduler that controls allocation of resources to all cores centrally (e.g., using processor-level core scheduler 165), or by distributed schedulers located within the processor cores (e.g., using core-level core scheduler 206).

In some examples, functional resources are allocated by adjusting the number of processor cores that are allocated for executing one or more of the instruction blocks. In other examples, the scheduling according to the performance metric can be finer-grained. The scheduler can be configured to initiate instruction fetch and/or instruction decode operations for speculatively-allocated blocks prior to all of the dependencies for the blocks being available to the processor core. In some examples, after initiating instruction fetch and decode, the scheduler is configured to inhibit execution of a speculatively allocated block until its dependencies are available to the processor core. In some examples, the scheduler is configured to allocate more functional resources of a single processor core to one instruction window of the processor core than to another instruction window within the same processor core. For example, if an instruction block executed using a first instruction window has a low branch mispredict rate or a high confidence level, most or all of the available functional resources can be scheduled for execution by that first instruction window. Correspondingly, a high mispredict rate/low confidence level second instruction window is allocated only idle functional resources, or a limited budget of functional resources, within the processor core. The scheduler is not limited to initiating fetch, decode, and execution for immediate target instruction blocks for the currently executing instruction block, but can also look ahead to dependent grandchildren and great-grandchildren instruction blocks, particularly in cases where the likelihood of branching to those particular instructions blocks is very high or has a probability of 1.0. In some examples, the number of functional resources allocated to an instruction block can be reduced when, for example, branch mispredict, load dependence speculation mispredict, cache miss, or load store conflicts become increasingly common. This can avoid wasting energy on speculative execution of such dependent instruction blocks until there is very high or absolute certainty that the instruction block will definitely execute.

XII. Example Method of Allocating Block-Based Processor Resources

Figure 10:
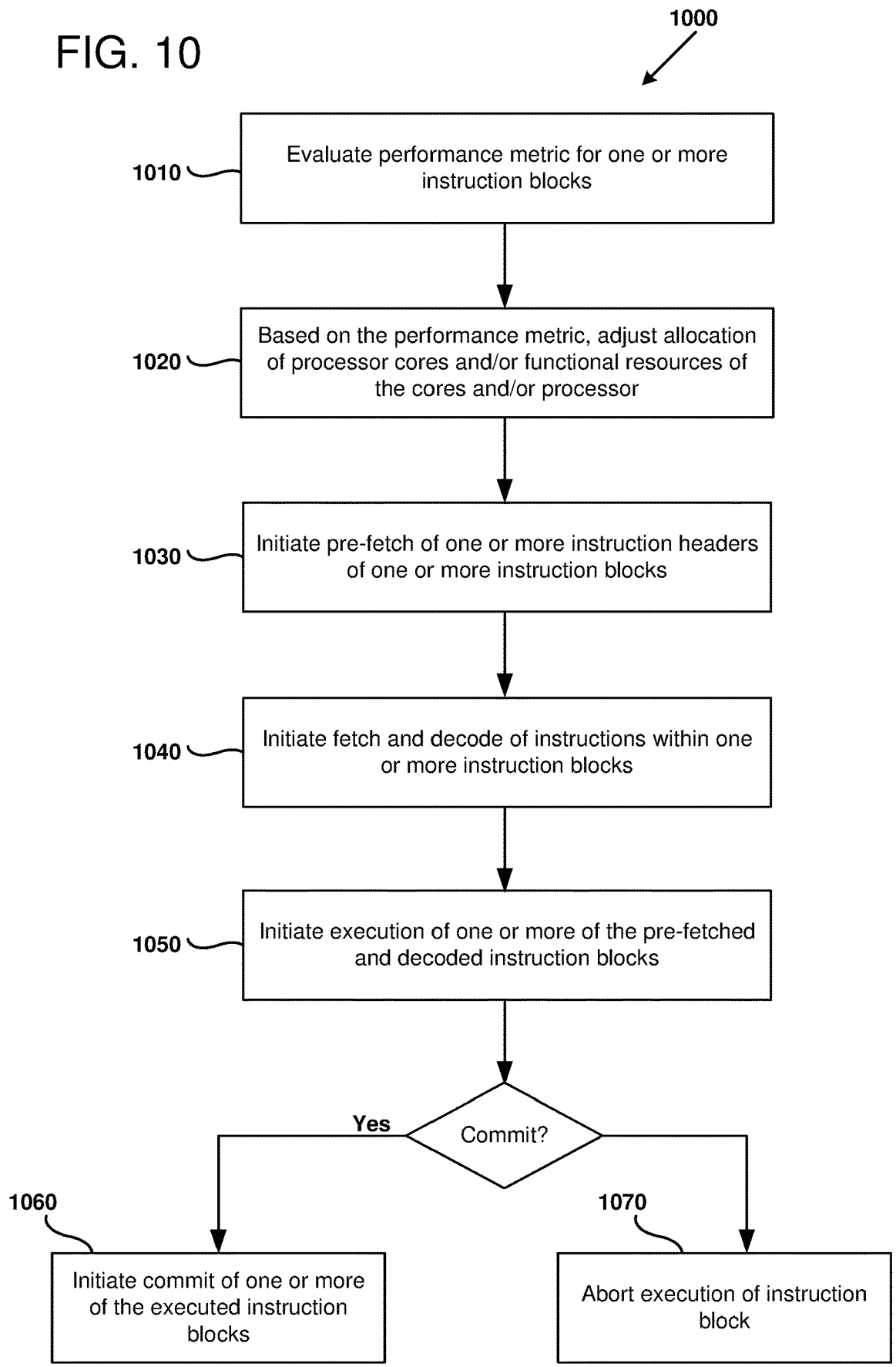
FIG. 10 is a flowchart illustrating an example method of adjusting allocation of processor cores and/or functional resources, as can be performed in some examples of the disclosed technology.

FIG. 10 is a block diagram 1000 outlining a method of allocating block-based processor resources, as can be practiced in certain examples of the disclosed technology. For example, the block-based processor of FIG. 1 can be used to perform the method outlined in the flowchart 1000.

At process block 1010, a performance metric is evaluated for one or more instruction blocks. As previously discussed, the performance metric can be determined statically and/or dynamically, and can be based on probabilities and statistics for a sequence of instructions, data collected using performance monitors such as performance counters, programmer or compiler directives, or a current operating environment of the block-based processor. For example, the performance metric used by the scheduler to allocate processor resources can be adjusted in order to obtain higher performance, and/or reduce energy usage by a block-based processor. Once the performance metric has been evaluated, the method proceeds to process block 1020.

At process block 1020, the allocation of processor cores and/or functional resources of the block-based processor cores and/or the block-based processor are adjusted based on the performance metric evaluated at process block 1010. For example, the number of cores, the number of instruction windows, the allowed states for an instruction block to proceed to, or other allocation of functional resources can be adjusted. In many implementations of a block-based processor, it may be more energy efficient to fetch and decode instruction headers and block instructions from an instruction block, but then wait to determine whether the particular instruction block will definitely execute before allowing the processor core to initiate the execution state of the processor core. The control unit of a block-based processor core adjusts the allocation before proceeding to process block 1030.

At process block 1030, fetching of one or more instruction headers of one or more instructions blocks is initiated. For example, based on confidence levels associated with branch instructions for a currently executing instruction block, one or more of the target location instruction blocks can initiate fetching by a mapped processor core. Because the instruction headers can include information regarding data dependencies and branch types, additional evaluation of performance metrics may be available after fetching an instruction header, in which case additional evaluation of performance metrics such as that described above regarding process block 1010 can be performed. After initiating fetch of the one or more instruction headers, the method proceeds to process block 1030.

At process block 1040, fetching and decoding of instructions within one or more of the instruction blocks is initiated. Operations that can be performed at process block 1040 include, but are not limited to: receiving I/O at the processor core, loading instructions into an instruction cache (e.g., instruction cache 227), decoding instructions from an instruction cache using a decoder (e.g., decoder 230), and loading instructions and available data into an instruction window (e.g., instruction window 210). For example, decoded instructions, operands, predicates, and dependencies can be loaded into an instruction window memory store during process block 1040 according to a particular configuration of a block-based processor scheduler. It will be readily understood to one of ordinary skill in the art that the precise operations associated with fetching and decoding of instructions blocks can vary depending on a particular implementation. In some examples, the scheduler signals to the processor core to wait after fetching and decoding until the instruction block's dependencies indicate that the instruction block is highly likely, or definitely likely, to execute. In other examples, the processor core scheduler can signal the process core to speculatively begin execution of the fetched and decoded instruction blocks. Once the control unit scheduler has indicated that execution is to initiate, the method proceeds to process block 1050 to begin execution.

At process block 1050, execution of the fetched and decoded instruction blocks is initiated, and the associated instructions of the instruction blocks will execute until the available instructions are exhausted, and/or the instruction block performs a branch instruction to a different instruction block target location.

The control unit also includes logic to ensure that the instruction block should definitely execute and, responsive to determining that the instruction block should definitely execute, will "commit" the instruction block. In this case, the method proceeds to process block 1060. Conversely, if all of the instruction block dependencies are not satisfied, or the instruction block otherwise should not have executed, the method proceeds to process block 1070.

At process block 1060, the instruction block is committed by completing any pending external operations specified by the instruction block. For example, store operations to memory and/or write operations to the processor registers can be performed as part of committing the instruction block. In some examples, upon commit, store operations queued in a load/store queue are written back to the memory hierarchy. In some examples, upon commit, the committed view of a transactional register file is updated to include the values written into the registers by the instruction block.

At process block 1070, the control unit issues an abort signal, and the results computed by the processor core will not be written to the processor registers and/or memory, along with any other operations to return the processor to a visible state as if the instruction block had never executed.

Whether the instruction block is committed at process block 1060 or aborted at process block 1070, the method can proceed back to any of process blocks 1010, 1020, 1030, 1040, or 1050, depending on a particular configuration of the processor. For example, the processor may not evaluate a performance metric for every instruction block execution, but instead evaluate at a periodic interval, receiving an interrupt, or other time period. In some examples, the method may skip instruction fetch and instead proceed to process block 1040 to execute instructions for a "warm" instruction block.

Accordingly, based on adjusting allocation of processor cores and/or functional resources of the cores and/or processor, performance and energy usage of the processor can be readily throttled to achieve performance, energy, and other goals according to the current configuration of the processor. As used herein, allocating a functional resources includes not only allocating particular identified cores and/or resources within a core and/or the processor, but also includes scheduling, performance of operations specified by instructions block for example initiating fetch, initiating execution, and/or committing one or more instruction blocks. Further, allocation of functional resources can be performed speculatively, or non-speculatively.

XIII. Example Processor Core Allocation Schemes

FIGS. 11A-11F depict operation of a block-based processor as it allocates functional resources according to a number of different schemes, as can be practiced according to the disclosed technology. Each of the schemes for allocating resources by the scheduler are designed to achieve different goals for overall processor functionality.

A. First Example Processor Core Allocation Scheme

Figure 11A:
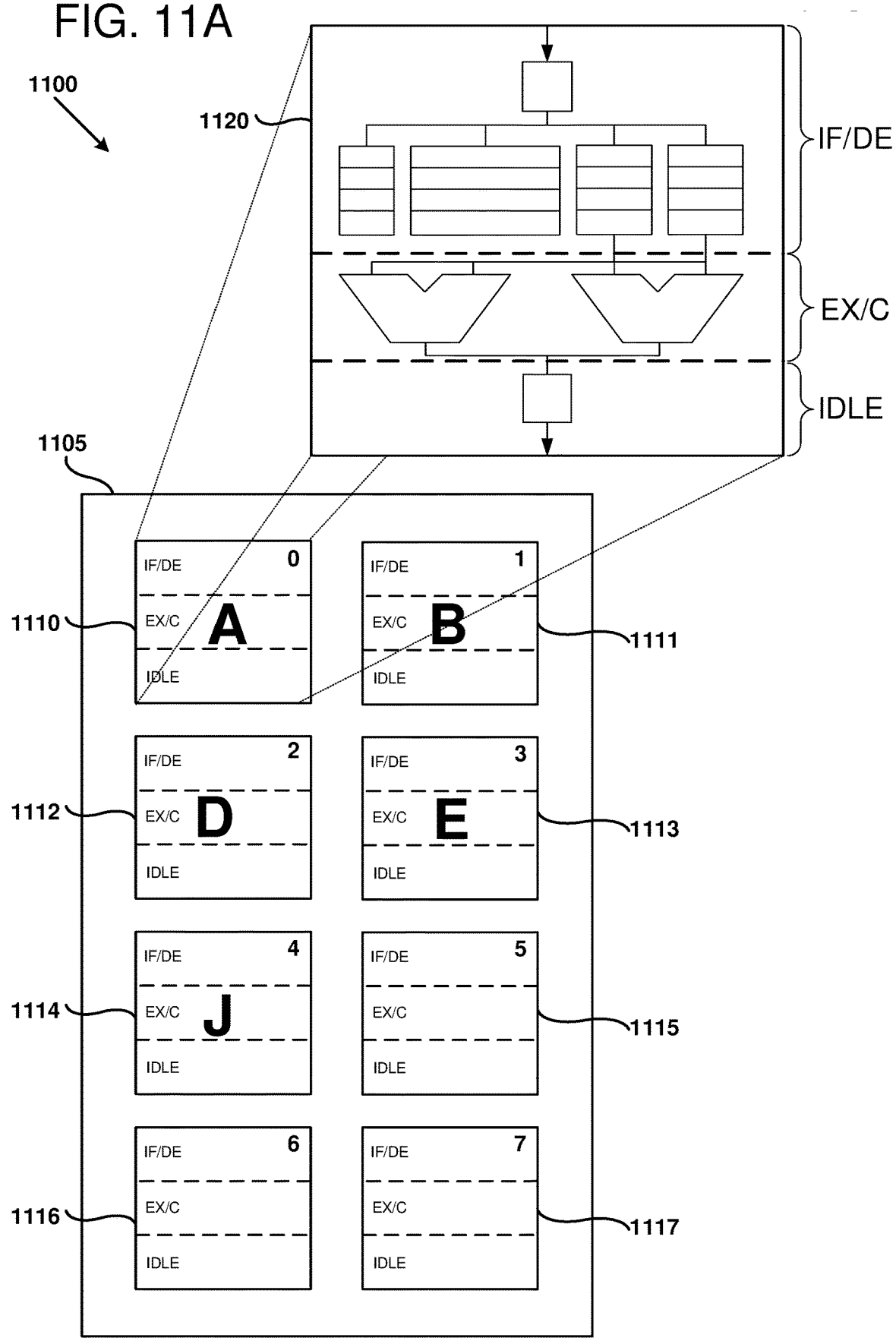
FIGS. 11A-11F illustrate examples of a scheduler allocating functional resources of processor cores in a block-based processor, as can be performed in some examples of the proposed technology.

FIG. 11A is a diagram 1100 illustrating a block-based processor 1105 including eight block-based processor cores 1110-1117. An inset highlights an expanded depiction 1120 showing a designation of functional resources within processor core 0 (reference numeral 1110). As shown, the expanded depiction 1120 of processor core 0 (1110) includes an instruction fetch and decode stage, an execution and commit stage, and an idle stage. Each of the stages includes hardware of the processor core that can be used during the various states specified for an instruction block according to a particular block-based instruction set architecture. Although the processor cores depicted in FIGS. 11A-11F are shown as having three stages for ease of explanation, it should be readily understood that different numbers of stages can be employed. For example, the exemplary processor states illustrated in FIG. 6 can correspond to execution stages in a processor core. Further, the "instruction fetch and decode state" or the "execution and commit" stages can each be implemented as two or more processor states, depending on the particular implementation.

The block-based processor 1105 in FIG. 11A is operating according to a "balanced" power scheme where the scheduler will attempt to fetch and decode instruction blocks that are determined to be highly likely to execute according to a performance metric. The likelihood associated with a process block branching to a particular child instruction block is illustrated in the control flow graph of FIG. 8, with confidence levels assigned according to Table 1 above. As shown in Table 1, the confidence level of instruction block A branching to instruction block B is highly likely (0.95). Thus, the core scheduler proceeds to fetch, decode, and initiate execution of instruction block B. However, instruction block B may not be able to begin execution until one or more of its dependences are available. For example, instruction block A may be producing memory stores or register writes that instruction block B consumes, in which case instruction block B can initiate execution, but does not actually execute dependent instructions until the associated operands are available. However, instruction block B's dependencies may not rely on instruction block A, in which case at least a portion of the instructions within instruction block B can begin executing.

Further, according to the particular scheme illustrated in FIG. 11A, instruction block D and instruction block E have the same confidence level (P_BD=P_BE=0.5) that the respective instruction blocks will execute (e.g., once instruction block B is determined to definitely execute). Therefore, instruction blocks D and E have been fetched, decoded, and execution initiated, depending on their respective dependencies being available for execution. Further, the confidence level of instruction block J executing given that instruction block E actually executes (P_EJ=1.0) means that instruction block J is also fetched, decoded, and execution initiated. It will be readily apparent to one of ordinary skill in the relevant art that the confidence level can be based, not just on the confidence letter of a particular edge in the control flow graph leading to a particular instruction block, but on the aggregated possibilities of a number of instruction block edges, which can be analyzed and used to determine that a child instruction block should be fetched and/or execution initiated. Accordingly, if the confidence levels of executing instruction blocks E, F, and G are particularly high, then instruction block J could be fetched based on the aggregate probability of its three parent instruction blocks E, F, and G. Alternatively, once instruction block J has been loaded onto a processor core, the core scheduler can de-prioritize flushing of a processor core that appears likely to be executed frequently according to dependencies of a sequence of instruction blocks.

B. Second Example Processor Core Allocation Scheme

Figure 11B:
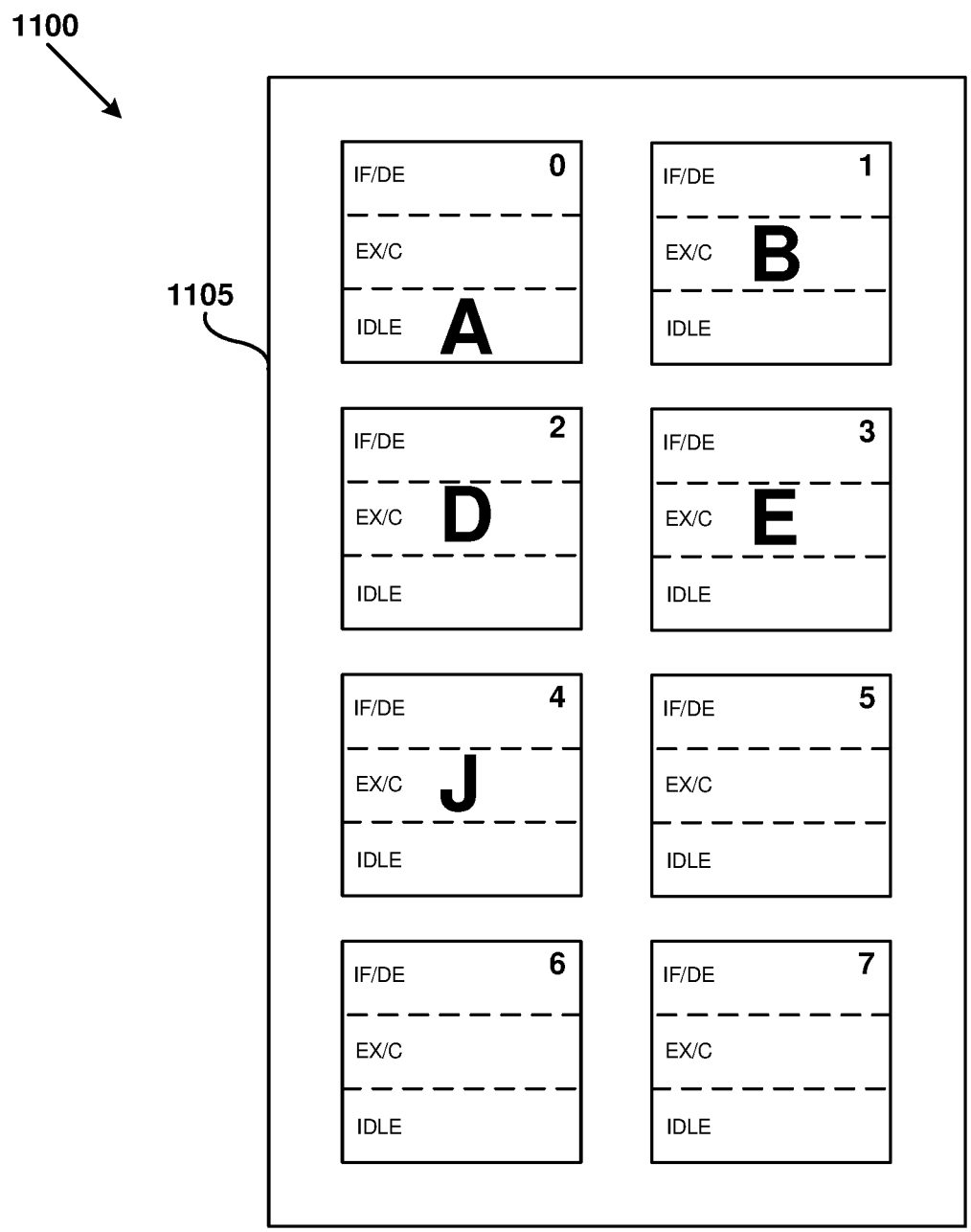

FIG. 11B illustrates the block-based processor 1105, when its scheduler has been configured to use a balanced power scheme with speculative execution. The processor can be scheduled to execute this scheme based on the configuration of the scheduler itself, and/or by using performance metric data to configure the scheduler for any particular scheme. As shown in FIG. 11B, instruction block A has completed execution and committed its register writes and memory stores, and is now in an idle state. Because instruction block A has completed execution, it is known that the branch from instruction block A to instruction block B was taken, and thus instruction block B has initiated execution. As shown in Table 1, the probability of branching from instruction block B to instruction block D (P_BD) is 0.5, or the same as the probability of branching from instruction block B to instruction block E (P_BE). Accordingly, under a speculative execution scheme, the block-based processor core 1105 is instructed to fetch, decode, and initiate execution of both instruction block D and instruction block E by its scheduler. Because only one of the instruction blocks will actually commit, this scheme can achieve higher performance, but at the cost of energy wasted by executing the non-committed instruction block (e.g., instruction block B or D). Further, as the probability of branching from instruction block E to instruction block J is 1.0, the scheduler proceeds to allocate instruction block J to processor core 4 and then fetch, decode, and initiate execution of instruction block J. Since execution is initiated for these three blocks, any of instruction blocks D, E, or J will begin actually executing as soon as their associate dependencies are available. Thus, in some cases, instruction block J could begin executing before instruction block E, depending on the respective instruction blocks' dependencies.

C. Third Example Processor Core Allocation Scheme

Figure 11C:
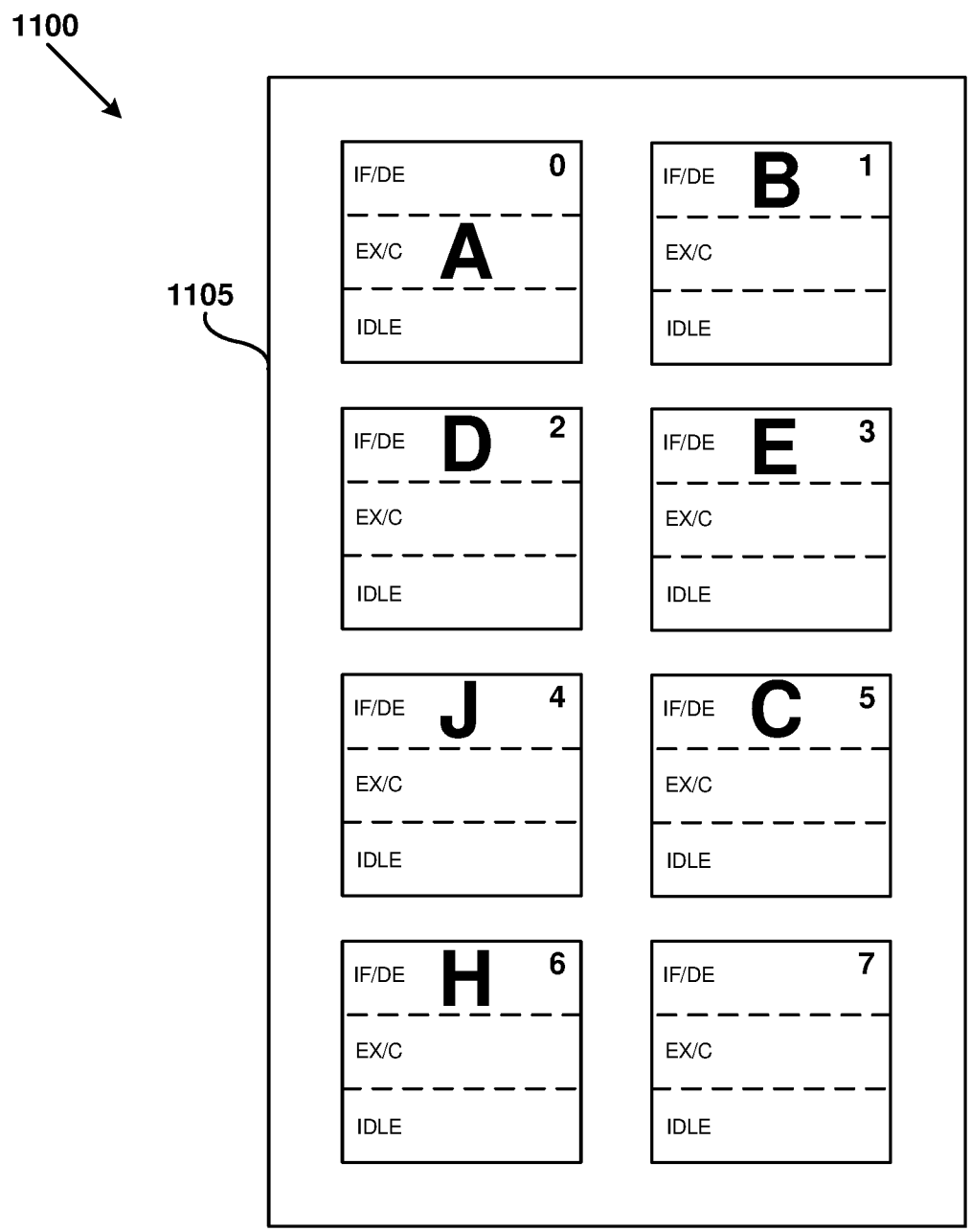

FIG. 11C illustrates the block-based processor according to a slightly different scheme for its processor core scheduler than shown in FIG. 11A or 11B. The processor scheduler in the example of FIG. 11C has determined a different set of confidence values, as illustrated in Table 2:

TABLE 2

| Edge | Confidence |
|---|---|
| P_AB | 0.5 |
| P_AC | 0.5 |
| P_BD | 0.5 |
| P_BE | 0.5 |
| P_CF | 0.05 |

TABLE 2-continued

| Edge | Confidence |
|---|---|
| P_CG | 0.10 |
| P_CH | 0.85 |
| P_EJ | 1.0 |
| P_FJ | 1.0 |
| P_GJ | 1.0 |
| P_DA | 1.0 |
| P_HA | 1.0 |
| P_JA | 1.0 |

As shown above in Table 2, the probability of certain branches being taken has changed over those in Table 1, and in particular the confidence level of A branching to B (P_AB) is now the same as the probability of A branching to C (P_AC), or 0.5. Thus, while instruction block A, is executing as shown in FIG. 11C, instruction block B and instruction block C, are fetched and decoded by their respective processor cores 1 and 5. However, the scheme is also adjusted, either according to the configuration of the scheduler, and/or performance metric data associated with the currently executing sequence of instruction blocks, such that dependent instruction blocks are fetched and decoded, but not yet initiated for execution. Further, some of the dependent instruction blocks of instruction blocks B and C are also fetched and decoded. For example, instruction blocks D, and E which depend from construction block B, instruction block F, which is the most probable branch from instruction block C (a confidence value of 0.9) are fetched and decoded. Further, instruction block J has been fetched and executed by processor core 4. Instruction block J is dependent on both instruction block E and instruction block F. Thus, even though instruction block J is further from instruction block A in the control flow graph, it has a higher likelihood of actually executing than some of the other instruction blocks that are closer to the currently executing instruction block A in the control flow graph. By initiating instruction fetch and decode of certain instruction blocks, but not initiating execution, an amount of energy can be saved by not speculatively executing the respective instruction blocks until the confidence level of a particular instruction block is high enough to warrant execution of the instruction block according to the current scheduling scheme.

D. Fourth Example Processor Core Allocation Scheme

Figure 11D:
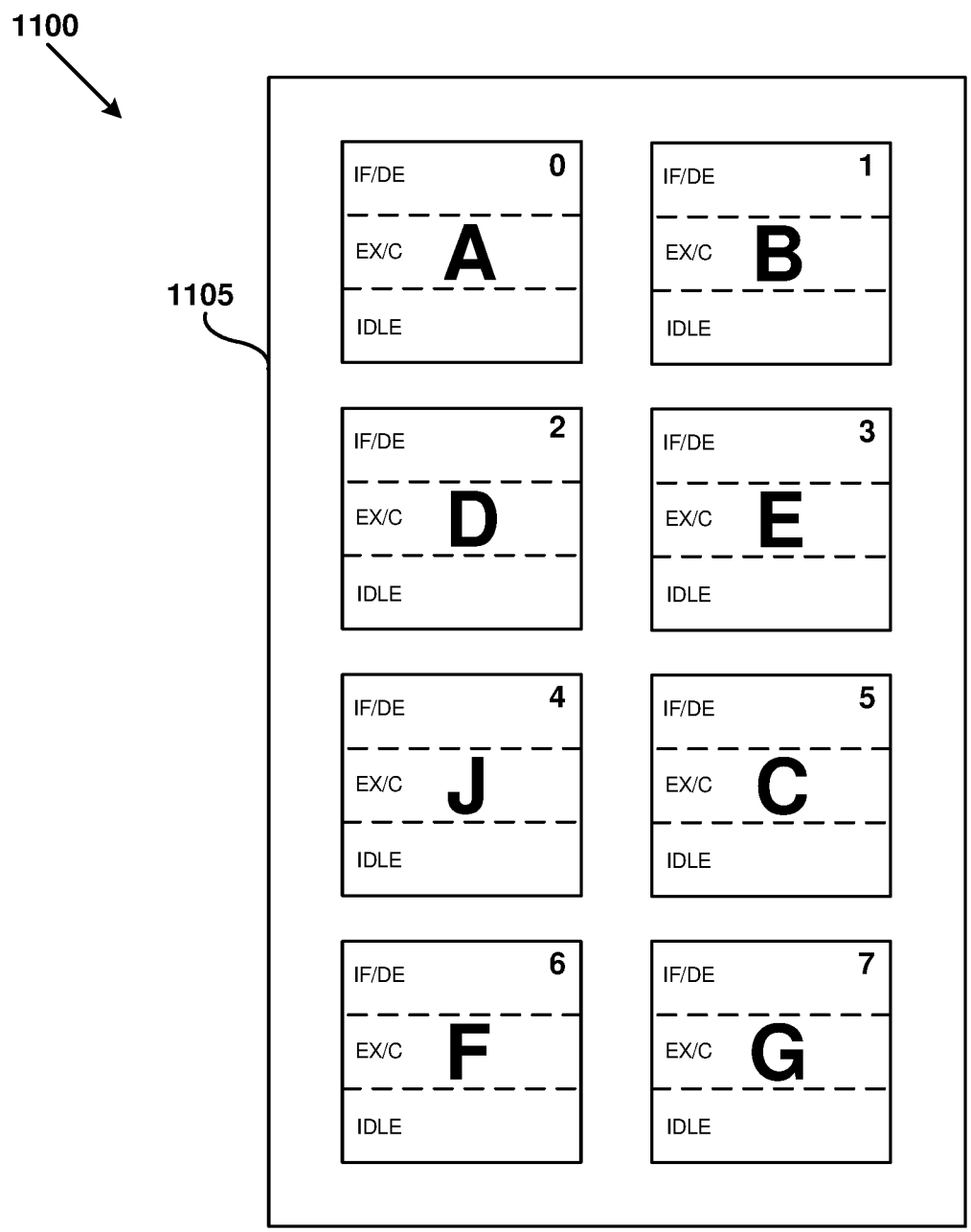

FIG. 11D illustrates the block-based processor 1105 while its processor cores are scheduled according to an exemplary aggressive performance scheme. Again, the control flow graph 800 and the confidence levels listed in Table 1 are used for this particular example. As shown in FIG. 11D, the core scheduler maps, fetches, and decodes, and initiates execution of as many instruction blocks as it has available processor cores, even though instruction block A is still executing on processor core 0. Thus, as shown, child instruction blocks B and C, their respective child blocks D, E, F, and G, and great-grandchild instruction block J have all fetched and decoded, and execution has been initiated. Thus, any of the processor cores 1-7 in FIG. 11D will begin executing as soon as their respective instruction block dependencies are available. Thus, the amount of time it takes to execute the illustrated sequence of instructions can be reduced, but at the cost of wasted energy from instruction blocks that execute but do not commit, because the sequence of instructions did not actually branch to those instruction blocks. It should also be noted that instruction block J has been fetched, and execution initiated, even before instruction block H, because the aggregate probability of actually executing instruction block J (P_AB×P_BE×P_EJ=0.95× 0.5×1.0=0.0475) is higher than the aggregate probability of actually executing instruction block H P_AC×P_CH=0.05× 0.05=0.0025), according to the example confidence values listed in Table 1 for the control flow graph 800.

It should be noted, however, that in the illustrated example of FIG. 11D, instruction block J has a single instance scheduled to run ahead from one of either instruction blocks E, F, or G, but not all three. In other words, Instruction block J can access updated registers and memory from one of blocks E, F, or G. For example, if execution path E→J is predicted, but when branch prediction resolves it is determined that execution F→J is actually taken, current run-ahead block J, based on the assumption that path E→J was taken, is aborted and block J is re-run based on the (now confirmed) assumption that path F→J was taken.

In other examples, three instances of instruction block J can execute concurrently, such that each instance has access to updated registers and memory from one of blocks E, F, or G. Thus, in the mis-predict example in the previous paragraph, a first core executes assuming E→J, a second core concurrently executes assuming F→J, and a third core concurrently executes assuming G→J. Once the determination of the path is made, the blocks executing E→J and G→J are aborted, while F→J continues to execute.

E. Fifth Example Processor Core Allocation Scheme

Figure 11E:
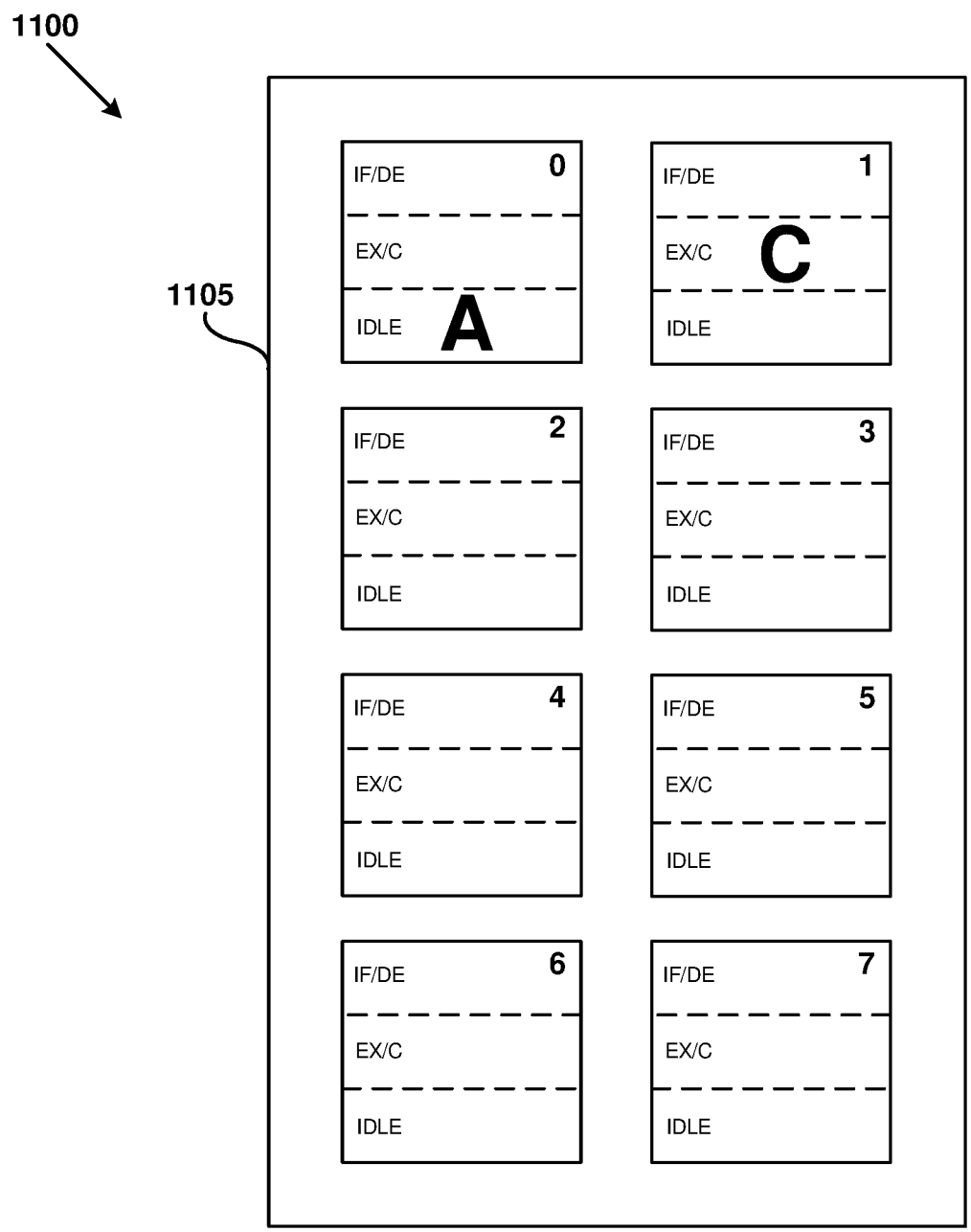

FIG. 11E illustrates the block-based processor 1105 while its processor cores are scheduled according to different scheduling scheme. The illustrated scheduling scheme is directed to reduce power consumption; therefore fetching, decoding, and executing of instruction block C does not begin until instruction block A has committed and begins entering its idle state. Notably, instruction block B was never fetched and loaded into the processor cores, even though the associated probability (P_AB=0.95) is much more likely than the probability of branching to instruction block C (P_AC=0.05). This is because the scheduler delayed fetch and decode until the branch target of instruction block A was definitely known. Further, it can be noted that instruction block C's dependent instruction blocks F, G, and H, are not yet fetched or decoded, because the scheduler is configured to wait until the branch target is definitely known (or in some examples, known with a sufficiently high probability). In some examples, fetch and decode can extend several levels down the control flow graph, depending on the associated probabilities of a branch being taken and the particular performance metrics used by the scheduler.

F. Sixth Example Processor Core Allocation Scheme

Figure 11F:
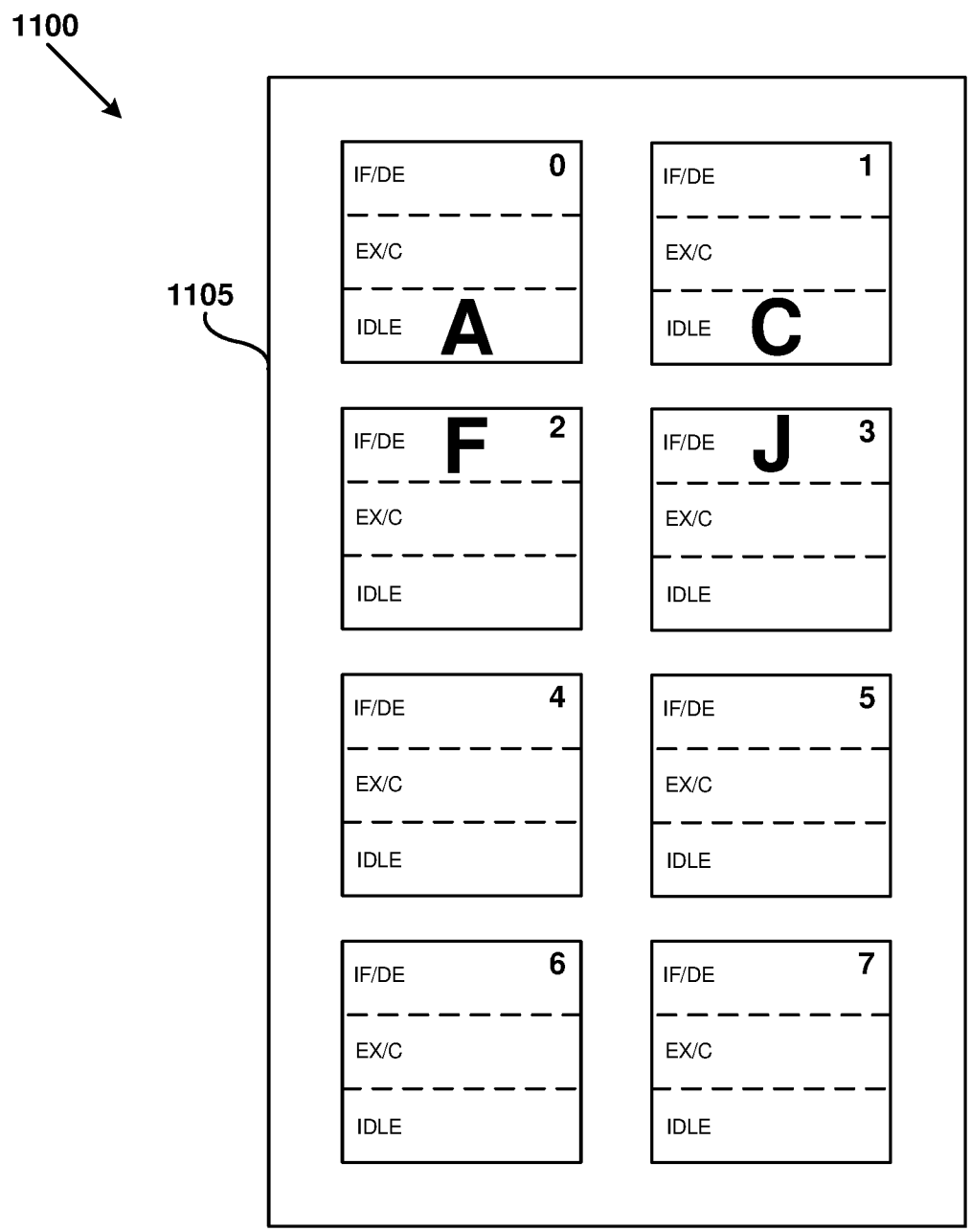

FIG. 11F illustrates the block-based processor 1105 after executing additional instruction blocks in a similar fashion as discussed above regarding FIG. 11E. As shown in FIG. 11F, instruction block A has executed, committed, and is idle. Instruction block C has executed, committed, and is idle. A branch instruction from instruction block C to instruction block F was taken and fetch and decode of instruction block F on processor core 2 is initiated. The scheduler determines that there is only one branch target for instruction block F and, accordingly, the branch from instruction block F to instruction block J will always be taken. Accordingly, instruction block J can be fetched and decoded with high confidence and without wasting energy.

It should be readily apparent to one of ordinary skill in the art that the examples depicted in FIGS. 11A-11F, the associated control flow graphs, instruction blocks, scheduling schemes, and confidence values are illustrative only and can be adjusted by a person of ordinary skill in the art depending on particular performance, energy, and other design goals in implementing a suitable block-based processor.

XIV. Example Method of Generating Object Code

Figure 12:
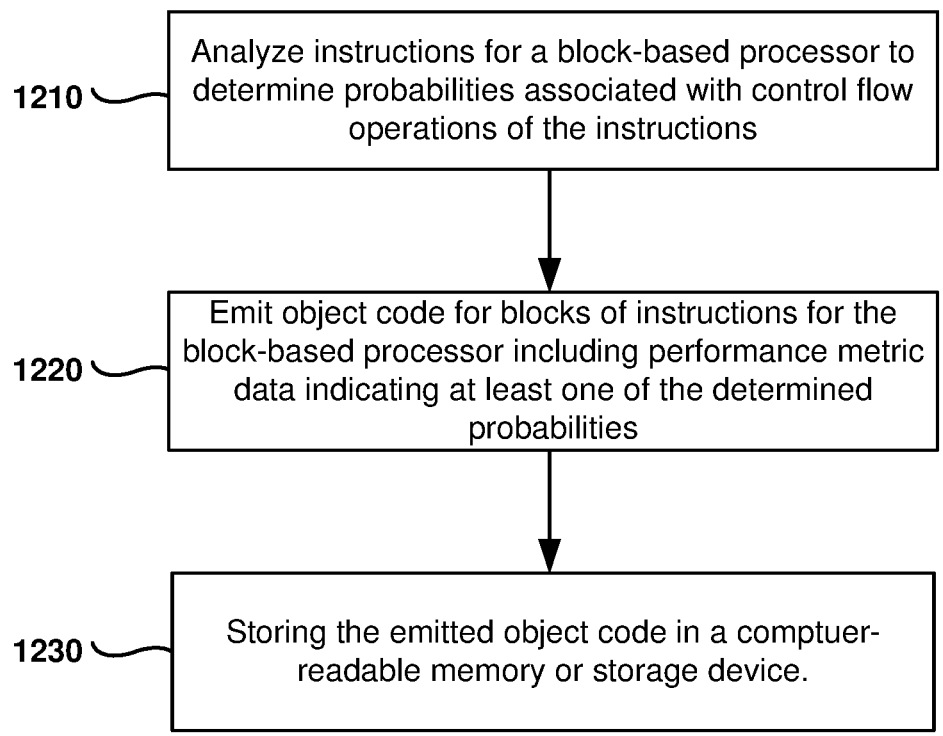
FIG. 12 is a flowchart illustrating an example method of generating object code for a block-based processor, including performance metric data, as can be performed in some examples of the disclosed technology.

FIG. 12 is a flowchart 1200 outlining an example method of generating object code for a block-based processor according to the disclosed technology. The method of FIG. 12 can be implemented, for example, with a compiler executing on a general-purpose processor or a compiler executing on a block-based processor.

At process block 1210, instructions for a block-based processor are analyzed to determine probabilities associated with control flow operations of the instructions. For example, static analysis of control flow graphs generated by a compiler can be used to determine probabilities that particular branches from the instruction blocks will be taken. In some examples, hardware resources and performance monitor of the block-based processor, such as program counters, can be used to analyze instructions. In some examples, a programmer can designate probabilities for some of the branches. For example, if the programmer knows that a particular portion of source code is associated with high entropy data (e.g., highly compressed or encrypted data), the programmer can indicate accordingly lower confidence levels. In some examples, an application workload profiler, run over a suite of representative workloads, collects and prepares probability data for use by the compiler. Similarly, the compiler or user can determine that a particular portion of source code is associated with a loop that is likely to execute a large number of times, and accordingly, its associated branch instruction will also have a high probability of being taken. Further, branch mispredicts, cache misses, cache aliasing, memory load conflicts, memory store flushes and other metrics can be analyzed, either statically or dynamically, to determine the associated probabilities. After determining associated probabilities for a sequence of instruction blocks, the method proceeds to process block 1220.

At process block 1220, object code is emitted for blocks of instructions for the block-based processor that includes performance metric data indicating at least one of the determined probabilities. In some examples, the object code includes at least a portion of the performance metric data in an instruction header (e.g., performance metric data 515), or in unused slots of the instruction block (e.g., performance metric data 322), or encoded within individual instructions of an instruction block (e.g., performance metric data 535). In other examples, the performance metric data can be stored in another portion of the object code as, for example, a table. Once at least a performance of the performance metric data determined at process block 1210 is emitted in the object code, the method proceeds to process block 1230.

At process block 1230, the emitted object code from process block 1220 is stored in a computer-readable memory or storage device. The object code can be stored and distributed using, for example removable media, such as floppy drives, flash drives, CD read/write drives, or other removable media, or transmitted over a computer network for example downloaded from a website or other server that is used to distribute the emitted object code.

XV. Example Computing Environment

Figure 13:
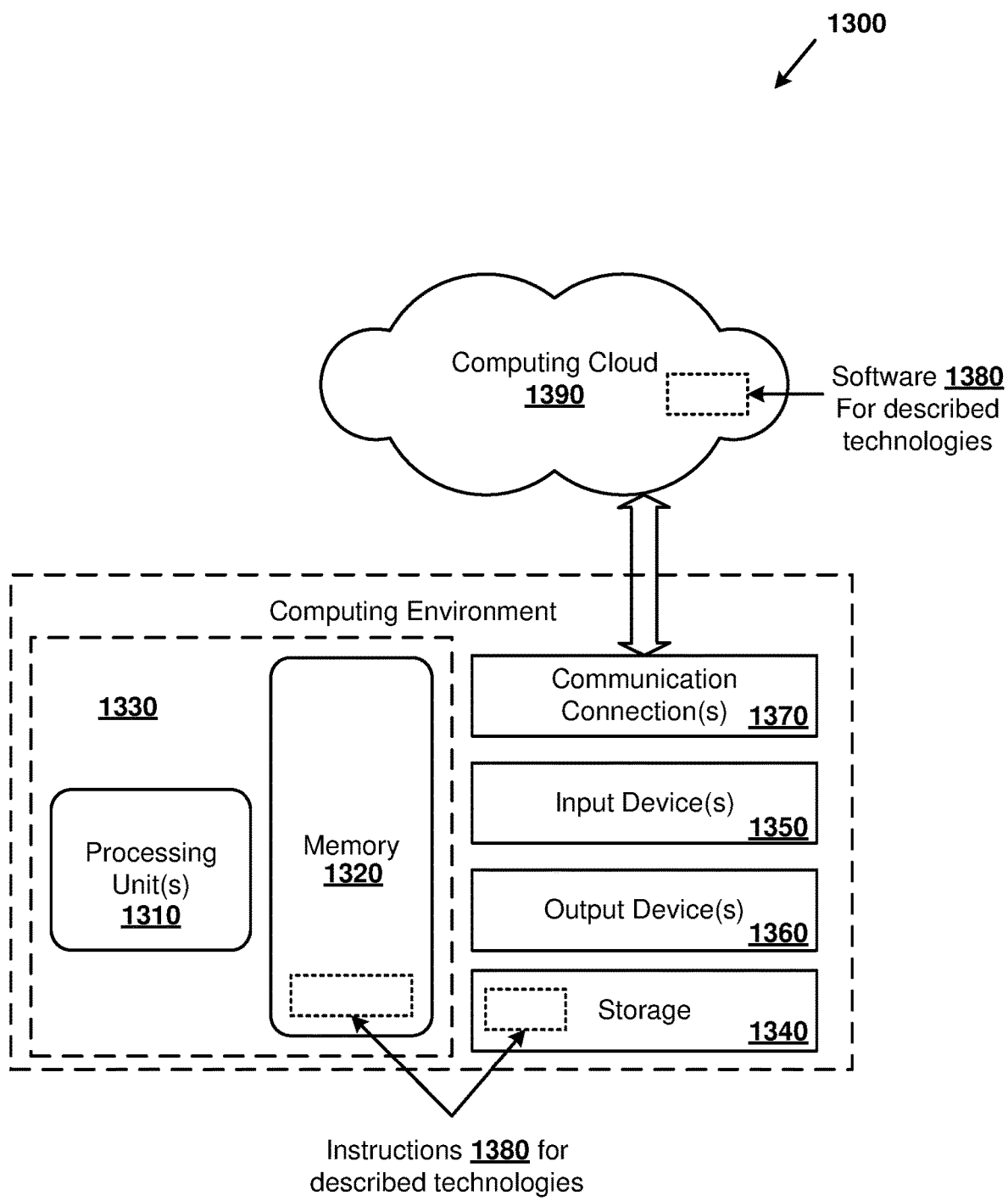
FIG. 13 is a block diagram illustrating a suitable computing environment for implementing some embodiments of the disclosed technology.

FIG. 13 illustrates a generalized example of a suitable computing environment 1300 in which described embodiments, techniques, and technologies, including throttled processor execution in a block-based processor, can be implemented. For example, the computing environment 1300 can implement throttling and scheduling of instruction blocks for execution by processor cores according to any of the schemes disclosed herein.

The computing environment 1300 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions for block-based instruction blocks) may be located in both local and remote memory storage devices.

With reference to FIG. 13, the computing environment 1300 includes at least one block-based processing unit 1310 and memory 1320. In FIG. 13, this most basic configuration 1330 is included within a dashed line. The block-based processing unit 1310 executes computer-executable instructions and may be a real or a virtual processor. In a multi-processing system, multiple processing units execute computer-executable instructions to increase processing power and as such, multiple processors can be running simultaneously. The memory 1320 may be volatile memory (e.g., registers, cache, RAM), non-volatile memory (e.g., ROM, EEPROM, flash memory, etc.), or some combination of the two. The memory 1320 stores software 1380, images, and video that can, for example, implement the technologies described herein. A computing environment may have additional features. For example, the computing environment 1300 includes storage 1340, one or more input devices 1350, one or more output devices 1360, and one or more communication connections 1370. An interconnection mechanism (not shown) such as a bus, a controller, or a network, interconnects the components of the computing environment 1300. Typically, operating system software (not shown) provides an operating environment for other software executing in the computing environment 1300, and coordinates activities of the components of the computing environment 1300.

The storage 1340 may be removable or non-removable, and includes magnetic disks, magnetic tapes or cassettes, CD-ROMs, CD-RWs, DVDs, or any other medium which can be used to store information and that can be accessed within the computing environment 1300. The storage 1340 stores instructions for the software 1380, plugin data, and messages, which can be used to implement technologies described herein.

The input device(s) 1350 may be a touch input device, such as a keyboard, keypad, mouse, touch screen display, pen, or trackball, a voice input device, a scanning device, or another device, that provides input to the computing environment 1300. For audio, the input device(s) 1350 may be a sound card or similar device that accepts audio input in analog or digital form, or a CD-ROM reader that provides audio samples to the computing environment 1300. The output device(s) 1360 may be a display, printer, speaker, CD-writer, or another device that provides output from the computing environment 1300.

The communication connection(s) 1370 enable communication over a communication medium (e.g., a connecting network) to another computing entity. The communication medium conveys information such as computer-executable instructions, compressed graphics information, video, or other data in a modulated data signal. The communication connection(s) 1370 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1390. For example, disclosed compilers and/or block-based-processor servers are located in the computing environment 1330, or the disclosed compilers can be executed on servers located in the computing cloud 1390. In some examples, the disclosed compilers execute on traditional central processing units (e.g., RISC or CISC processors).

Computer-readable media are any available media that can be accessed within a computing environment 1300. By way of example, and not limitation, with the computing environment 1300, computer-readable media include memory 1320 and/or storage 1340. As should be readily understood, the term computer-readable storage media includes the media for data storage such as memory 1320 and storage 1340, and not transmission media such as modulated data signals.

XVI. Additional Examples of the Disclosed Technology

Additional examples of the disclosed subject matter are discussed herein in accordance with the examples discussed above.

In some examples of the disclosed technology, a block-based instruction set architecture processor includes one or more processing cores configured to fetch and execute a sequence of instruction blocks, each of the processing cores comprising functional resources for performing operations specified by the instruction blocks and one or more core schedulers configured to allocate functional resources for performing at least a portion of the operations, the functional resources being allocated for executing the sequence of instruction blocks based at least in part on a performance metric.

In some examples of the processor, the performance metric is based at least in part on branch prediction accuracy for one or more branch instructions of the allocated instruction blocks. In some examples, the performance metric is based at least in part on one or more of the following metrics determined for the sequence of instruction blocks: instruction cache misses, instruction cache aliasing, data cache misses, data cache aliasing, memory load conflicts, memory store flushes, or data entropy. In some examples, the performance metric is based at least in part on a tolerance level for energy usage by the processor. In some examples, the processor further comprises one or more performance counters configured to monitor performance of the processor, and the performance metric is determined based at least in part on data received from the performance counters.

In some examples, the core scheduler(s) are configured to speculatively initiate instruction fetch and/or instruction decode operations for a speculatively allocated block prior to dependencies for the speculatively allocated block being available, and the core scheduler(s) are configured to inhibit execution of the speculatively allocated block until dependencies for the speculatively allocated block are available. In some examples, the core scheduler(s) are configured to speculatively initiate fetch, decode, and execute instruction operations for target blocks of one or more branches of an instruction block concurrently being fetched, decoded, or executed, based at least in part on the performance metric. In some examples, the core scheduler(s) are configured to, when a confidence component of the performance metric increases, branch to and execute instructions on a processor core that includes previously-fetched, or previously-fetched and previously-decoded, instruction blocks. In some examples, the core scheduler(s) are configured to adjust a number of processor cores and/or functional resources of processor cores allocated to executing the sequence of instructions based on comparing the confidence rating to one or more predetermined values. In some examples, at least one of the processor cores comprises two or more instruction windows, and the core scheduler(s) are configured to allocate more functional resources of the at least one processor core to one of the instruction windows having a higher confidence level. In some examples, the core scheduler(s) are configured to adjust the number of instruction blocks that are prefetched, decoded, and/or executed based on comparing the confidence rating to one or more predetermined values. In some examples, the core scheduler(s) are implemented as processor-level core schedulers within a control unit. In other examples, the core scheduler(s) are implemented using one or more block-based processor core(s). In some examples, at least one of the processor cores is configured to prefetch and/or decode one or more instruction headers for one or more target instruction blocks of a currently executing instruction block.

In other examples of the disclosed technology, a method includes executing a first instruction block with a block-based processor and prior to completing execution of the first instruction block, initiating allocation of a second instruction block to one or more processor cores of the block-based processor based at least in part on a performance metric for the block-based processor. In some examples of the method, the initiating allocation comprises initiating fetching and decoding of the second instruction block, but not initiating execution of the second instruction block until the control logic for the block-based processor determines that the second instruction block will definitely execute. In some examples, the method further includes, prior to completing execution of the first instruction block, initiating allocation of a third instruction block to one or more processor cores of the block-based processor based at least in part on comparing a probability of the third instruction block being executed to a predetermined threshold value. In some examples, the performance metric is based at least in part on object code data indicating operation probabilities for the first instruction block, the second instruction block, or the first and the second instruction blocks.

In other examples of the disclosed technology, one or more computer-readable storage devices or memory storing computer-readable instructions that when executed by a processor, cause the processor to perform a method, the computer-readable instructions including instructions to analyze instructions for a block-based processor to determine probabilities for control flow operations performed using the block-based processor instructions, and instructions to emit object code for instruction blocks for the block-based processor, the emitted object code including performance metric data indicating at least one of the determined probabilities. In some examples, the performance metric data are encoded within instruction headers of the emitted instruction block object code. In some examples, the performance metric data are based at least in part on a static analysis of instructions in the instruction blocks. In some examples, one or more computer-readable storage devices or memory storing the emitted instruction block produced by performing the method performed when executing the computer-readable instructions stored on the one or more computer-readable storage devices or memory.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. An apparatus comprising a processor, the processor comprising:
    one or more processing cores configured to fetch and execute a sequence of instruction groups, each of the one or more processing cores comprising functional resources performing operations specified by the sequence of instruction groups; and
    one or more core schedulers:
        allocating processing cores performing at least a portion of operations specified by child instruction groups of the sequence by a respective aggregated confidence rating, for two or more parent instruction groups, of a child instruction group of the child instruction groups, each of the two or more parent instruction groups being on a respective separate instruction path converging on the child instruction group, and
        determining the respective aggregated confidence rating by combining confidence ratings for the converging instruction paths of the two or more parent instruction groups of the child instruction group, and consequently according to the respective aggregated confidence rating, initiating execution of the child instruction group prior to initiating execution of at least one of the child instruction group's two or more parent instruction groups.

2. The apparatus of claim 1, wherein the respective aggregated confidence rating is based at least in part on branch prediction accuracy for one or more branch instructions of the two or more parent instruction groups.

3. The apparatus of claim 1, wherein the processor further comprises one or more performance counters configured to monitor performance of the processor, and wherein the respective aggregated confidence rating is determined based at least in part on data received from the performance counters.

4. The apparatus of claim 1, wherein:
    the one or more core schedulers are configured to speculatively initiate instruction fetch, instruction decode, or instruction fetch and instruction decode operations for the child instruction group prior to dependencies for the child instruction group being available; and
    the one or more core schedulers are configured to inhibit execution of the child instruction group until dependencies for the child instruction group are available.

5. The apparatus of claim 1, wherein the one or more core schedulers are configured to speculatively initiate fetch, decode, and execute instruction operations for child instruction groups of one or more branches of an instruction group concurrently being fetched, decoded, or executed, based at least in part on the aggregated confidence rating.

6. The apparatus of claim 1, wherein the one or more core schedulers are configured to, based at least in part on confidence rating increasing, branch to and execute instructions on a processor core that includes previously-fetched, or previously-fetched and previously-decoded, instruction groups.

7. The apparatus of claim 1, wherein the one or more core schedulers are configured to adjust a number of processor cores, a number of functional resources of processor cores, or a number of processor cores and functional resources of processor cores allocated to executing the sequence of instruction groups based on comparing the aggregated confidence rating to one or more predetermined values.

8. The apparatus of claim 7, wherein at least one of the processor cores comprises two or more instruction windows, and wherein the one or more core schedulers are configured to allocate more functional resources of the at least one processor core to one of the two or more instruction windows having a higher confidence level.

9. The apparatus of claim 1, wherein the one or more core schedulers are configured to adjust the number of instruction groups that are prefetched, decoded, or executed based on comparing a confidence rating to one or more predetermined values.

10. The apparatus of claim 1, wherein at least one of the one or more processing cores is configured to prefetch, decode, or prefetch and decode one or more instruction headers for one or more target instruction groups of a currently executing instruction group.

11. A method performed by a core scheduler for at least two processor cores configured to fetch and execute a sequence of instruction groups, each of the at least two processor cores comprising functional resources for performing operations specified by the sequence of instruction groups, the method comprising:
    aggregating confidence ratings of two or more parent instruction groups of a child instruction group to determine an aggregated confidence rating of the child instruction group;
    determining that the aggregated confidence rating of the child instruction group is higher than a confidence rating of at least one of the parent instruction groups of the child instruction group, each of the parent instruction groups being on a respective separate instruction path to the child instruction group;
    based on the determining, allocating one of the at least two processor cores to perform at least a portion of operations specified by the child instruction group of the sequence according to the aggregated confidence rating; and
    responsive to the allocating, initiating execution of the child instruction group prior to initiating execution of the at least one of the parent instruction groups.

12. The method of claim 11, wherein the aggregated confidence rating is based at least in part on branch prediction accuracy for one or more branch instructions of the two or more parent instruction groups.

13. The method of claim 11, further comprising using one or more performance counters to monitor performance of the one or more processor cores, and wherein the aggregated confidence rating is determined based at least in part on data received from the one or more performance counters.

14. The method of claim 11, wherein the core scheduler is configured to, based at least in part on the aggregated confidence rating increasing, branch to and execute instructions on a processor core that includes previously-fetched, or previously-fetched and previously-decoded, instruction groups.

15. The method of claim 11, wherein core scheduler is configured to adjust a number of processor cores, a number of functional resources of processor cores, or a number of processor cores and functional resources of processor cores allocated to executing the sequence of instruction groups based on comparing the aggregated confidence rating to one or more predetermined values.

16. The method of claim 11, wherein the core scheduler is configured to adjust a number of instruction groups that are prefetched, decoded, or executed based on comparing a confidence rating to one or more predetermined values.

17. The method of claim 11, wherein at least one of the one or more processor cores is configured to prefetch, decode, or prefetch and decode one or more instruction headers for one or more target instruction groups of a currently executing instruction group.

18. One or more computer-readable storage media storing instructions for causing one or more core schedulers to perform a method, the one or more core schedulers controlling one or more processor cores that are configured to fetch and execute a sequence of instruction groups, each of the one or more processor cores comprising functional resources performing operations specified by the sequence of instruction groups, the method comprising:
    allocating processor cores performing at least a portion of operations specified by child instruction groups of the sequence by aggregating confidence ratings for two or more parent instruction groups of a child instruction group of the child instruction groups into an aggregated confidence rating of the child instruction group, each of the two or more parent instruction groups comprising a conditional branch instruction targeting the child instruction group, each of the two or more parent instruction groups being on a respective separate instruction path to the child instruction group; and
    determining that the aggregated confidence rating of the child instruction group is higher than a confidence rating of at least one of the two or more parent instruction groups of the child instruction group, and consequently, according to the aggregated confidence rating, initiating execution of the child instruction group prior to initiating execution of the at least one of the two or more parent instruction groups.

19. The one or more computer-readable storage media of claim 18, wherein the method further comprises using one or more performance counters configured to monitor performance of the one or more processor cores.

20. The one or more computer-readable storage media of claim 19, wherein the aggregated confidence rating is determined based at least in part on data received from the one or more performance counters.

21. The apparatus of claim 1, wherein a first one and a second one of the converging paths are multi-segment paths sharing a common segment, with
    the one or more core schedulers further:
        determining the confidence ratings of the corresponding parent instruction groups by combining confidence ratings of individual segments of the respective multi-segment paths; and
        maintaining confidence ratings of the common segment which are dependent on preceding segments of the respective multi-segment paths.

22. The apparatus of claim 1, wherein the initiated execution of the child instruction group is a first executing instance of the child instruction group; and
    the one or more core schedulers further initiating a second executing instance of the child instruction group, wherein the first and second instances have access to register and memory updates of different respective parent instruction groups.

* * * * *